(12) United States Patent
Medeiros et al.

(10) Patent No.: US 12,348,403 B1
(45) Date of Patent: Jul. 1, 2025

(54) VERIFICATION OF DATA COMMUNICATION SPECIFICATION USING SEQUENCE NUMBER-BASED MONITOR SYNCHRONIZATION

(71) Applicant: Cadence Design Systems, Inc., San Jose, CA (US)

(72) Inventors: Pedro Eugenio Medeiros, Belo Horizonte (BR); Claire Liyan Ying, Los Altos Hills, CA (US); Gustavo Emanuel Faria Araujo, Belo Horizonte (BR)

(73) Assignee: Cadence Design Systems, Inc., San Jose, CA (US)

( * ) Notice: Subject to any disclaimer, the term of this patent is extended or adjusted under 35 U.S.C. 154(b) by 13 days.

(21) Appl. No.: 18/581,274

(22) Filed: Feb. 19, 2024

(51) Int. Cl.
| | |
|---|---|
| *H04L 12/26* | (2006.01) |
| *H04L 1/1607* | (2023.01) |
| *H04L 1/18* | (2023.01) |
| *H04L 43/20* | (2022.01) |
| *H04L 43/50* | (2022.01) |
| *H04W 24/10* | (2009.01) |

(52) U.S. Cl.
CPC ............ *H04L 43/50* (2013.01); *H04L 1/1642* (2013.01); *H04L 43/20* (2022.05)

(58) Field of Classification Search
CPC ....... H04L 43/50; H04L 43/20; H04L 1/1642; H04L 12/26; H04L 1/18; H04W 24/10
USPC .......................................................... 709/224
See application file for complete search history.

(56) References Cited

U.S. PATENT DOCUMENTS

| | | | |
|---|---|---|---|
| 2007/0234139 A1* | 10/2007 | Kalantri | .................. H04L 43/50 714/712 |
| 2013/0044604 A1* | 2/2013 | Hatley | .................... H04L 43/10 370/241 |
| 2021/0021504 A1* | 1/2021 | Balasubramanian | ........................ H04L 1/1864 |
| 2021/0022028 A1* | 1/2021 | Balasubramanian | ... H04L 1/241 |

\* cited by examiner

*Primary Examiner* — Jude Jean Gilles
(74) *Attorney, Agent, or Firm* — Schwegman Lundberg & Woessner, P.A.

(57) ABSTRACT

Various embodiments provide for verifying operation of a circuit design with respect to a data communication specification, such as a Peripheral Component Interconnect Express (PCIe) specification, using sequence numbers (e.g., fixed byte-size unit (FLIT) sequence numbers) of data packets (e.g., FLITs) to synchronize monitoring of data transactions over a data bus.

20 Claims, 13 Drawing Sheets

VERIFICATION OF DATA COMMUNICATION SPECIFICATION USING SEQUENCE NUMBER-BASED MONITOR SYNCHRONIZATION

TECHNICAL FIELD

Embodiments described herein relate to circuit design and, more particularly, to systems, methods, devices, and instructions for verifying operation of a circuit design with respect to a data communication specification, such as a Peripheral Component Interconnect Express (PCIe) specification, using sequence numbers of data packets to synchronize monitoring of data transactions over a data bus.

BACKGROUND

In the context of data communication specification (e.g., protocols or specifications), fixed byte-size unit (FLIT) sequences can be a fundamental component of the data transmission process. A FLIT can represent a basic or smallest unit of data used in a packet-switched network or data (e.g., serial data) communication interface like an interface that complies with a version of the PCIe (Peripheral Component Interconnect Express) specification or protocol. PCIe is a serial computer bus specification (e.g., a bus protocol or standard) and certain versions of the PCIe specification, such as PCIe 6.0, use FLIT-based encoding to enhance data integrity and efficiency in high-bandwidth systems.

BRIEF DESCRIPTION OF THE DRAWINGS

The appended drawings merely illustrate various embodiments of the present disclosure and should not be considered as limiting its scope.

DETAILED DESCRIPTION

Figure 1:
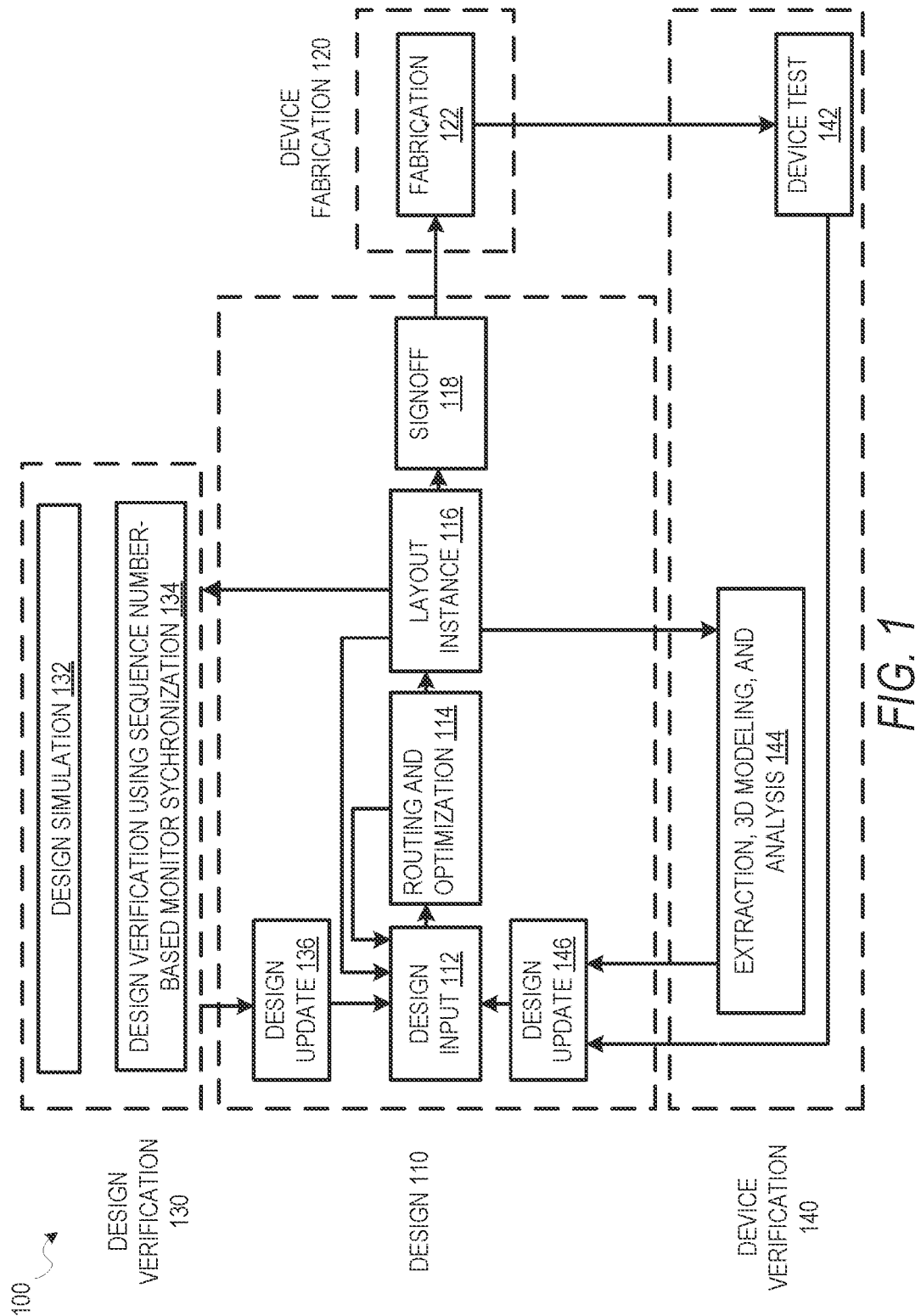
FIG. 1 is a diagram illustrating an example design process flow for design verification using a sequence number-based monitor synchronization, according to some embodiments.

With respect to the PCIe (e.g., PCIe 6.0) specification, FLIT mode operation is a packet-based transmission mode where data is sent in fixed-size units. As used herein, a fixed byte-size unit (FLIT) can represent a basic or smallest unit of data used in a packet-switched network or data (e.g., serial) communication interface. FLIT mode (or FLIT-based encoding) can improve bandwidth, reduce latency, and provide improved error handling (e.g., forward error correction (FEC)), thereby increasing the efficiency and reliability of data transfers. Generally, FLITs can include sequence numbering, which ensure data coherence and ensure that components within a system (e.g., PCIe system) are synchronized, thereby enabling reliable data communication between devices (e.g., devices connected by a PCIe bus). For the PCIe specification, sequence numbers (e.g., FLIT sequence numbers) are used to track and manage the sequence of FLITs as they are transmitted across a PCIe-specification-compliant bus (also referred to herein as a PCIe bus). Further, certain versions of PCIe protocol make use of transaction layer packets (TLPs), data link layer packets (DLLPs), where TLPs are used for the main data traffic, carrying information between the endpoints of a PCIe bus, and where DLLPs are used for link management and control functions, such as power management, acknowledgment and negative-acknowledgment (ACK/NAK) of the reception of packets, and initialization of link and flow control credits.

Generally, as part of ensuring a circuit design will operate as intended/expected (e.g., in accordance with a predefined design or specification), a (design) verification process can be performed on one or more portions of the circuit design to ensure that those portions, and any circuit design intellectual property components (or IP blocks) included therein, function as expected/intended (e.g., meet certain predefined specifications). As used herein, a circuit design (e.g., implementing an electronic device) being verified can be referred to as a device under test (DUT) or a design under verification (DUV). DUT and DUV may be used interchangeably throughout this description. Usually, the circuit design being verified is a non-manufactured/non-physical instance of the circuit design as described by circuit design data (e.g., generated using an electronic design automation (EDA) system). In contrast, a physical circuit design or physical device is tested during a manufacturing test. In the context of verifying an IP block (e.g., PCIe IP block) of circuit design that implements one or more features of a PCIe specification, the circuit design can represent, for example, a System-on-a-chip (SOC), a PCIe component, or a PCIe device.

To facilitate (design) verification of a circuit design (e.g., DUT/DUV) implementing a data communication specification, such as a version of the PCIe specification, a user typically uses a verification software system configured to simulate data traffic over a data bus (e.g., simulated data bus, such as a simulated PCIe bus) coupled to the circuit design and configured to perform one or more specification checks (e.g., protocol checks) on the circuit design. For instance, a (design) verification software system, such as a verification intellectual property (VIP) software system, can verify one or more IP blocks (e.g., PCIe IP blocks) of a circuit design with respect to a version of the PCIe specification. Typically, a VIP software system comprises a pre-packaged set of code (which can be referred to as VIP) used for verification of an IP block with respect to pre-defined specification. The VIP can, for instance, include a set of assertions on a data bus (e.g., simulated data bus, such as a simulated PCIe bus) that can be used to verify an IP block with respect to a version of the PCIe specification. The verification software system can be part of a testbench, which can comprise a virtual verification environment that includes one or more simulators used in verifying operation of a circuit design (e.g., prior to closure of the circuit design). A verification software system (e.g., VIP software system) for a data communication specification (e.g., PCIe) can comprise a bus functional model (BFM), which can include one or more data protocol checks for one or more protocol layers defined by the data communication specification. For instance, with respect to a PCIe specification, the BFM of a verification software system can include protocol checks for one or more of a transaction layer packets (TL), a data link layer (DLL), a physical (PHY) layer (PL), a PHY interface for PCIe (PIPE), and the like. Interactions with the DUT/DUV can be generated by an active verification device (e.g., simulated device) of a verification software system in accordance with a model (e.g., BFM or VIP model), where the active verification device can send (e.g., transmit over a simulated data bus) one or more stimuli to the DUT/DUV (e.g., over a simulated data bus) and can receive one or more responses sent (e.g., transmitted over the simulated data bus) by the DUT/DUV, where the one or more responses are sent in sent in response to the one or more stimuli.

Traditionally, to verify one or more functions of a circuit design with respect to a data communication specification such as PCIe (e.g., PCIe 6.0 specification), a verification monitor task or process (e.g., VIP monitor) of a verification software system examines transmitted data from a DUT/DUV to update the verification monitor task/process's state (e.g., internal state machine) and keep the verification monitor in sync with the DUT/DUV. The verification monitor task/process can verify the one or more functions of the circuit design based on a state (e.g., updated state) of the verification monitor task/process. Verification of a data communication specification that uses sequence numbers in data packets (e.g., FLIT sequence numbers in FLITs) can present various challenges. For instance, the use of FLITs and their sequence numbers according to a PCIe specification (e.g., PCIe 6.0) results in the use of several specification variables that are hidden (e.g., implicit variables) and not sent on a data link over a PCIe bus. Accordingly, with the FLIT sequence number feature, there is no direct way of sampling the value of one or more hidden variables by just looking at the data link and, if there is some error that is not visible in the data link, either by error injection or DUT/DUV problem, a verification software system and a DUT/DUV get out of sync, and it is challenging to know where precisely the problem happened. At times, the effects of such a hidden variable changing can have an effect on data transmitted by a DUT/DUV on the PCIe bus much later then when the change happened. One or more hidden variables (of the DUT/DUV) may be updated only by received data. Additionally, some parts of the flow in a PCIe specification involve decisions that are implementation-specific or not based on anything seen on the data link over a PCIe bus. For instance, a DUT/DUV can render an internal decision to request for retransmission of a FLIT, where the request is visible to a verification monitor task or process (also referred to herein as a verification monitor), but the internal decision is not.

One or more of these challenges can lead to a verification monitor (of a verification software system) getting out of sync with a DUT during a verification process (e.g., a protocol check). As a consequence, a verification monitor task/process may render a different decision than a DUT during a verification process and update variables (e.g., the verification monitor's internal state machine) differently than those of the DUT. In turn, this can cause a simulation (e.g., PCIe simulation) of the verification software system to start showing one or more bogus errors and can also cause a debug process (e.g., to understand what caused the one or more bogus errors) to be complex and time-consuming. Overall, the use of sequence numbers in FLITs can render verification of circuit designs that include components or functionality in accordance with a PCIe specification (or the like) to be very challenging, as a verification monitor (e.g., VIP monitor) of a verification process would have to keep up with a DUT and identify violations (e.g., PCIe specification violations) when the DUT makes decisions that are not visible in the data link.

Various embodiments described herein cure these and other deficiencies of conventional verification methodologies, especially with respect to verifying implementation of a data communication specification, such as PCIe, by a circuit design. According to some embodiments, operation of a circuit design (e.g., operation of one or more IP blocks of the circuit design) is verified with respect to a data communication specification, such as a PCIe specification, using sequence numbers (e.g., fixed byte-size unit (FLIT) sequence numbers) of data packets (e.g., FLITs) to synchronize monitoring of data transactions over a data bus (e.g., simulated data bus) compliant with the data communication specification (e.g., a PCIe-compliant data bus). Some embodiments can facilitate improved verification of data transactions based on the data communication specification. According to some embodiments, a verification software platform, such as a VIP software platform, uses a sequence number-based mechanism to enable a verification monitor (e.g., a VIP monitor) to accurately track and validate a sequence of data packets (e.g., FLITs). The sequence number-based mechanism can deduce the status of incoming data packets to a DUT based on outgoing acknowledgments (ACKs) or negative acknowledgments (NACKs) from the DUT. For some embodiments, an incoming data packet (e.g., incoming FLIT) to the DUT comprises an associated sequence number (e.g., FLIT sequence number), and an ACK/NAK from the DUT comprises a sequence number that associates the ACK/NAK with an incoming data packet that has the same sequence number. Various embodiments enable a verification software platform to deduce how a DUT/DUV has processed an incoming data packet (e.g., an RX FLIT) to the DUT/DUV based on an output data packet (e.g., a TX ACK/NAK FLIT) from the DUT/DUV, which can enable a verification monitor to keep in sync, perform verification of one or more sequence number variables (e.g., sequence number fields in data packets), provide insightful information that can assist in a debug process, and do so without adding processing delay of TLPs and DLLPs. The approach of some embodiments can simplify a debugging process by making it easier to pinpoint the exact location of a verification error, thereby enhancing the efficiency of a verification process in complex verification environments (e.g., one for verifying a version of the PCIe specification).

According to some embodiments, a design verification process (on a verification software system) using a sequence number-based monitor synchronization comprises delaying the processing of sequence number fields (e.g., FLIT sequence number fields) of data packets (e.g., FLITs) received, from a DUT/DUV, (on receive/RX path of a verification monitor) by a verification monitor until a correspondent ACK/NAK (e.g., a correspondent ACK/NAK FLIT) is transmitted by the DUT/DUV (on a transmit/TX path of the DUT/DUV). For some embodiments, the sequence number-based verification design verification process causes a receive/RX path of a verification monitor to accumulate data packets (e.g., FLITs) received from a DUT/

DUV in a waiting queue to be processed later, and processes data packets (e.g., FLITs) accumulated in (e.g., added to) the waiting queue based on correspondent ACKs/NAKs (e.g., correspondent ACK/NAK FLITs) transmitted by the DUT/DUV on a transmit/TX path of the DUT/DUV.

By waiting for correspondent ACKs/NAKs, a sequence number-based verification design verification can deduce if a DUT/DUV has processed incoming data packets (e.g., incoming FLITs) received by the DUT/DUV as valid or invalid, which can permit a verification monitor task or process to keep in sync and perform validation of sequence number fields of data packets (e.g., FLITs) received from the DUT/DUV.

By use of various embodiments, a verification software platform (e.g., VIP software system) can verify a DUT/DUV while considering the complexity of a sequence number (e.g., FLIT sequence number) feature of different data communication specifications. In doing so, a verification software platform of various embodiments can ensure that a verification monitor task or process (of the verification software platform) remains in sync with a DUT, can remain in sync without adding processing delay of TLPs or DLLPs, and can remain in sync even when one or more errors occur that are not directly observable on a data link over a data bus (e.g., simulated data bus) operatively coupling the DUT with the verification software system. With respect to debugging one or more verification failures detected by a verification monitor task or process, various embodiments enable a verification software system to generate a trace file with more information regarding the DUT/DUV's state (e.g., hidden variables) based on the verification monitor task/process's state (e.g., internal variables).

Though various embodiments are described herein with respect to verifying a circuit design with respect to a version of the PCIe specification, some embodiments can be applied to one or more other data communication specifications (e.g., protocols or standards) that make use of FLITs or the like.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a diagram illustrating an example design process flow 100 for design verification using a sequence number-based monitor synchronization, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. The routing and optimization 114 operation may also include other operations not shown, such as those relating to floor planning, placement, post-placement optimization, and post-routing optimization.

While the design process flow 100 shows optimization occurring prior to a layout instance 116, timing analysis and optimization may be performed at any time to verify operation of a circuit design. For instance, in various embodiments, timing analysis in a circuit design may be performed prior to routing of connections in the circuit design; after routing, during register transfer level (RTL) operations; or as part of a signoff 118, as described below.

Design inputs are used in the design input 112 operation to generate an initial circuit layout. The design inputs may be further processed during the design input 112 operation via a process, such as logic-synthesis, to generate a circuit netlist mapped to a target standard library manufacturable by the foundry in a fabrication 122 operation. After design inputs are used in the design input 112 operation to generate an initial Circuit layout, and any of the routing and optimization 114 operations are performed, a resulting layout is generated as the layout instance 116. The netlist, as placed by the layout instance 116, describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations and layout modifications generated based on actual device performance. A design update 136 based on the design verification phase 130, a design update 146 from the device test 142 operations or the extraction, 3D modeling, and analysis 144 operations, or the design input 112 operation may occur after the initial layout instance 116 is generated. In various embodiments, whenever design inputs are used to update or change an aspect of a circuit design, a timing analysis and the routing and optimization 114 operations may be performed.

As shown, the design verification phase 130 includes a design verification using sequence number-based monitor synchronization 134 operation, which can be configured to verify one or more operations of a circuit design with respect to a data communication specification, such as a version of the PCIe specification (e.g., PCIe 6.0), using sequence numbers (e.g., fixed byte-size unit (FLIT) sequence numbers) of data packets (e.g., FLITs) to synchronize monitoring of data transactions over a data bus (e.g., simulated data bus) compliant with the data communication specification, in accordance with various embodiment described herein. Depending on the embodiment, the design verification using sequence number-based monitor synchronization 134 operation can be performed as part of a verification software system and, more specifically, as part of a verification monitor task or process (also referred to herein as a verification monitor) of the verification software system. For example, with respect to a version of a PCIe specification (e.g., PCIe 6.0), the design verification using sequence number-based monitor synchronization 134 operation can cause a verification monitor (e.g., VIP monitor) to accumulate incoming FLITs, from an active verification device (e.g., VIP model) to a DUT, in a wait queue. The design verification using sequence number-based monitor synchronization 134 operation can cause the verification monitor to delay (or defer) processing of accumulated FLITs until an acknowledgment (ACK) FLIT or negative acknowledgment (NAK) FLIT is, comprising a select sequence number, is transmitted by the DUT. The design verification using sequence number-based monitor synchronization 134 operation can cause the verification monitor to process accumulated FLITs from the wait queue based on the transmitted ACK/NAK FLIT, where processing includes updating internal variables of the verification monitor (e.g., VIP monitor) to reflect the status of the FLITs observed as determined by the DUT. The design verification using sequence number-based monitor synchronization 134 operation can cause the verification monitor to detect whether the DUT has processed a valid FLIT (from the active verification device to the DUT) as invalid based on the transmitted ACK/NAK FLIT and adjusting the verification monitor's state to remain in synchronization with the DUT. The design verification using sequence number-based monitor synchronization 134 operation can cause the verification monitor to report one or more errors in a sequence of FLITs when a verification process of the verification monitor identifies inconsistencies with the version of the PCIe specification.

Figure 2:
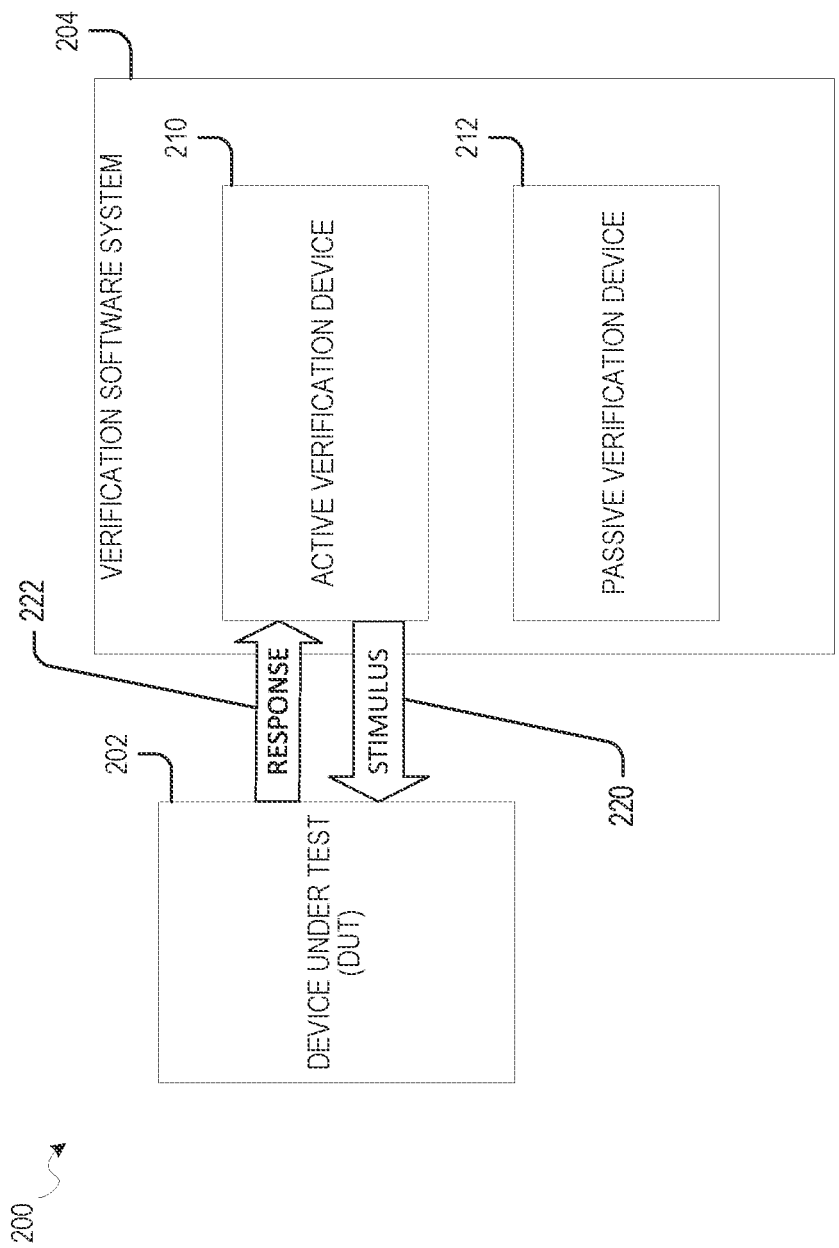
FIG. 2 is a block diagram illustrating an example design verification environment in which design verification using sequence number-based monitor synchronization can be implemented in accordance with some embodiments.

FIG. 2 is a block diagram illustrating an example design verification environment 200 in which design verification using sequence number-based monitor synchronization can be implemented in accordance with some embodiments. As shown, the design verification environment 200 includes a device under test (DUT) 202 and a verification software system 204, where the DUT 202 can comprise a simulation of a circuit design operating as an active device (e.g., PCIe device), and where the verification software system 204 can represent a testbench. According to some embodiments, the verification software system 204 interacts with the DUT 202 (e.g., exchanges stimuli and responses) over a simulated data bus that operatively couples the verification software system 204 with the DUT 202 together, where the simulated data bus can be in compliance with a data communication specification (e.g., a version of the PCIe specification). Depending on the embodiment, the DUT 202, the verification software system 204, or both can be operated by (e.g., within) one or more simulators.

The verification software system 204 of FIG. 2 comprises an active verification device 210 (e.g., active verification VIP device) and a passive verification device 212 (e.g., passive verification VIP device). One or both of the active verification device 210 and the passive verification device 212 are implemented by a task, process, or simulated device. According to some embodiments, the active verification device 210 is configured to generate one or more stimuli (220) and to send the one or more stimuli to the DUT 202 (e.g., according to a VIP model, such as a BFM) to facilitate verification implementation of one or more feature (e.g., functions) by the DUT in accordance with a data communication specification (e.g., PCIe specification). For some embodiments, the one or more stimuli comprise one or more data packets (e.g., FLITs) transmitted from the active verification device 210 to the DUT 202. The DUT 202 can respond to the one or more stimuli (e.g., FLITs incoming from the active verification device 210) with one or more responses (222). For some embodiments, the one or more responses comprise an acknowledgment-related data packet, such as an acknowledgment data packet (e.g., ACK FLIT) or a negative-acknowledgment data packet (e.g., NAK FLIT).

For various embodiments, the passive verification device 212 operates as a verification monitor (e.g., VIP monitor) configured to monitor one or more stimuli and one or more responses exchanged between the active verification device 210 and the DUT 202, maintain (and update) an internal state of the passive verification device 212 based on the one or more stimuli and the one or more responses observed by the passive verification device 212, and verify one or more feature (e.g., functions) of the DUT 202 based on the internal state. According to some embodiments, the verification software system 204 implements design verification using sequence number-based monitor synchronization. For instance, the passive verification device 212 operating as a verification monitor can implement design verification sequence number-based monitor synchronization in accordance with various embodiments described herein.

FIGS. 3 through 7 are flowcharts illustrating example methods for design verification using a sequence number-based monitor synchronization, according to some embodiments. It will be understood that example methods described herein may be performed by a device, such as a computing device executing instructions of a (design) verification software system, in accordance with some embodiments. Additionally, example methods described herein may be implemented in the form of executable instructions stored on a computer-readable medium or in the form of electronic circuitry. For instance, the operations of any one of methods 300, 400, 500, 600, 700 of FIGS. 3 through 7 may be represented by executable instructions that, when executed by a processor of a computing device, cause the computing device to perform the method. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel. An operation of any of methods 300, 400, 500, 600, 700 (or another method described herein) may be performed by a hardware processor (e.g., central processing unit or graphics processing unit) of a computing device (e.g., desktop, server, etc.). Depending on the embodiment, any of methods 300, 400, 500, 600, 700 can be used to perform design verification (e.g., 130) of a circuit design.

Figure 3:
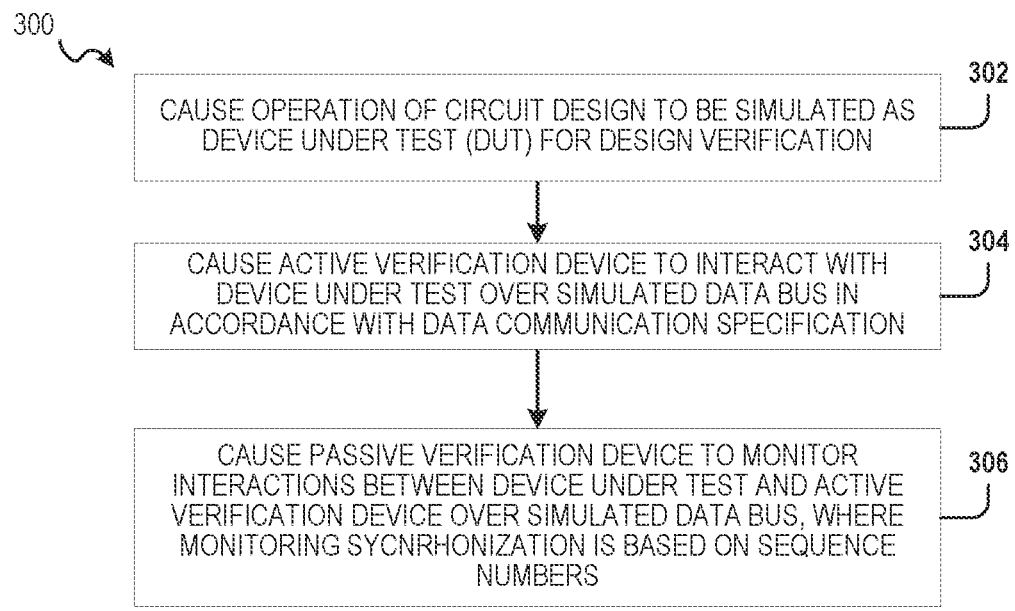
FIGS. 3 through 7 are flowcharts illustrating example methods for design verification using a sequence number-based monitor synchronization, according to some embodiments.

Referring now to FIG. 3, method 300 is an example method for design verification using a sequence number-based monitor synchronization. At operation 302, a hardware processor causes operation of a circuit design to be simulated by a device under test (DUT) (e.g., 202) for design verification and, at operation 304, the hardware processor causes an active verification device (e.g., 210) to interact with the device under test (e.g., 202) over a simulated data bus in accordance with a data communication specification (e.g., a PCIe specification). During operation 306, the hardware processor causes a passive verification device (e.g., 212) to monitor interactions between the device under test (e.g., 202) and the active verification device (e.g., 210) over the simulated data bus, where the passive verification device uses monitoring synchronization based on sequence numbers. According to some embodiments, the passive verification device performs one or more of methods 400, 500, 600, 700 of FIGS. 4 through 7 to implement sequence number-based monitoring synchronization.

Figure 4:
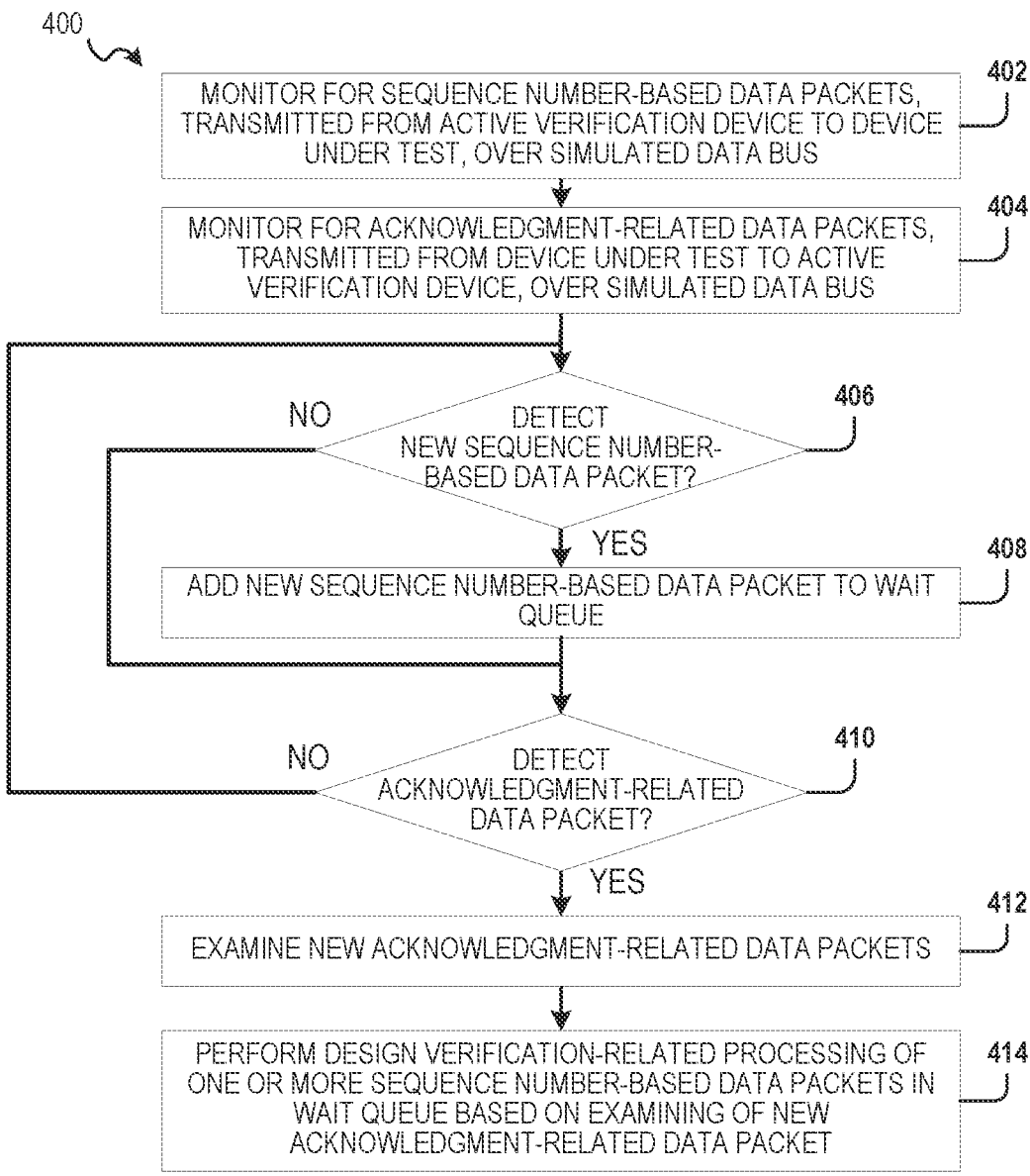

Referring now to FIG. 4, method 400 is an example method for design verification using a sequence number-based monitor synchronization. For some embodiments, method 400 represents a method performed by a verification monitor (e.g., a passive verification device operating as a verification monitor) to implement design verification using sequence number-based monitor synchronization. One or more operations of method 400 are performed while operation of a circuit design is simulated as a device under test (DUT) for design verification. At operation 402, a hardware processor (e.g., implementing the passive verification device) monitors for sequence number-based data packets, transmitted from an active verification device to a device under test, over a simulated data bus (e.g., in accordance with a data communication specification that DUT is being verified for). For some embodiments, each sequence number-based data packet comprises a sequence number. For some embodiments, each data packet is a fixed byte-size unit (FLIT). Additionally, for some embodiments, each sequence number-based data packet is a payload FLIT. Additionally, at operation 404, the hardware processor (e.g., implementing the passive verification device) monitors for acknowledgment-related data packets transmitted from the device under test to the active verification device over the simulated data bus.

Based on the monitoring of operation 402, the hardware processor (e.g., implementing the passive verification device) can detect (e.g., monitor) for a new sequence number-based data packet being transmitted from the active verification device to the device under test over the simulated data bus during operation 406. At operation 406, if the hardware processor (e.g., implementing the passive verification device) detects a new sequence number-based data packet being transmitted from the active verification device to the device under test over the simulated data bus (e.g., in accordance with the data communication specification that DUT is being verified for), method 400 proceeds to operation 408, otherwise method 400 proceeds to operation 410. At operation 408, the hardware processor defers (e.g., delays) design verification-related processing of the new sequence number-based data packet by adding the new sequence number-based data packet to a wait queue. In particular, for some embodiments, the hardware processor defers design verification-related detects for new payload FLITs, and defers design verification-related processing of a (detected) new payload FLIT by adding the new payload FLIT to the wait queue. According to some embodiments, the one or more new sequence number-based data packets stored in the wait queue are being deferred (e.g., delayed) for processing for design verification of the device under test (e.g., in accordance with the design communication specification). For some embodiments, the wait queues are part of the passive verification device (e.g., of the verification monitor). After operation 406, method 400 can proceed to operation 410.

Based on the monitoring of operation 404, the hardware processor (e.g., implementing the passive verification device) can detect (e.g., monitor) for a new acknowledgment-related data packet (e.g., ACK/NAK data packet, such as an ACK/NAK FLIT) being transmitted from the active verification device to the device under test over the simulated data bus during operation 410. At operation 410, if the hardware processor (e.g., implementing the passive verification device) detects a new acknowledgment-related data packet being transmitted from the active verification device to the device under test over the simulated data bus, method 400 proceeds to operation 412, otherwise method 400 returns to operation 406, where method 400 can continue to detect for a new sequence number-based data packet being transmitted from the active verification device to the device under test over the simulated data bus.

At operation 412, the hardware processor (e.g., implementing the passive verification device) examines the new acknowledgment-related data packet (detected by during operation 410). For some embodiments, operation 412 comprises examining one or more sequence number-based data packets in the wait queue for processing based on detection of the (transmitted) new acknowledgment-related data packet. During operation 414, the hardware processor (e.g., implementing the passive verification device) performs design verification-related processing of one or more sequence number-based data packets in the wait queue based on the examining of the new acknowledgment-related data packet. More regarding operations 412 and 414 is described with respect to FIG. 5, which illustrates an example implementation of operations 412 and 414.

Figure 5:
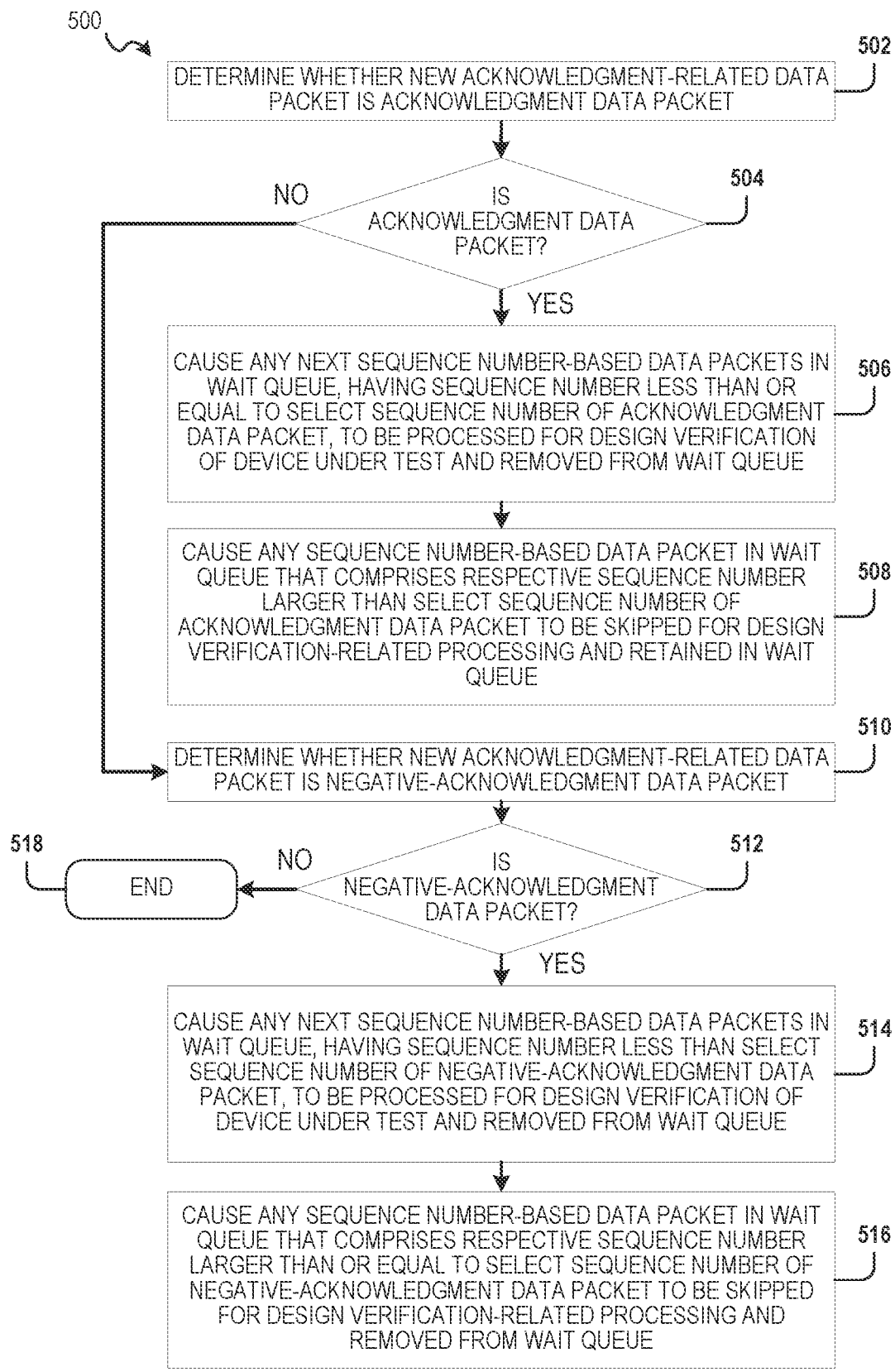

Referring now to FIG. 5, method 500 is an example method for design verification using a sequence number-based monitor synchronization. For some embodiments, method 500 represents a method performed by a verification monitor (e.g., 212) in response to the verification monitor detecting an acknowledgment-related data packet (e.g., ACK or NAK FLIT) being transmitted by a DUT (e.g., 202). Depending on the embodiments, operation 502 can be performed as part of operation 412, and one or more of operations 506, 508, 514, and 516 can be performed as part of operation 414.

At operation 502, a hardware processor (e.g., implementing the passive verification device) determines whether the new acknowledgment-related data packet is an acknowledgment data packet. For some embodiments, the new acknowledgment-related data packet is an acknowledgment (ACK) FLIT. At operation 504, if the hardware processor (e.g., implementing the passive verification device) determines that the new acknowledgment-related data packet is an acknowledgment data packet, method 500 proceeds to operation 506, otherwise method 500 proceeds to operation 510.

For operation 506, the hardware processor (e.g., implementing the passive verification device) causes any (e.g., each) next sequence number-based data packets in the wait queue that comprises a sequence number less than or equal to the select sequence number of the acknowledgment data packet to be processed for design verification of the device under test and to be removed from the wait queue. By performing operation 506, the hardware processor can cause all sequence number-based data packets in the wait queue that have a sequence number up to and including the select sequence number of the acknowledgment data packet to be processed for design verification of the device under test. For operation 508, the hardware processor (e.g., implementing the passive verification device) causes any sequence number-based data packet in the wait queue that comprises a respective sequence number larger than the select sequence number of the acknowledgment data packet to be skipped for design verification-related processing and to be retained in the wait queue. Accordingly, during operation 506, the hardware processor causes any (e.g., each) sequence number-based data packet in the wait queue that comprises a respective sequence number larger than a select sequence number of the acknowledgment data packet to be skipped for design verification-related processing. Additionally, any sequence number-based data packet retained in the wait queue by operation 508 can be reexamined and possibly processed for design verification in response to another acknowledgment-related data packet (e.g., ACK/NAK data packet) detected (e.g., by operation 404 of method 400).

At operation 510, the hardware processor (e.g., implementing the passive verification device) determines whether the new acknowledgment-related data packet is a negative-acknowledgment data packet. For some embodiments, the negative-acknowledgment data packet is a negative-acknowledgment (NAK) FLIT. At operation 512, if the hardware processor (e.g., implementing the passive verification device) determines that the new acknowledgment-related data packet is a negative-acknowledgment data packet, method 500 proceeds to operation 514, otherwise method 500 ends at operation 518.

During operation 514, the hardware processor (e.g., implementing the passive verification device) causes any next sequence number-based data packets in the wait queue that comprises a sequence number less than a select sequence number of the negative-acknowledgment data packet to be processed for design verification of the device under test and to be removed from the wait queue. By performing operation 514, the hardware processor can cause all sequence number-based data packets in the wait queue that have a sequence number up to the select sequence number of the acknowledgment data packet to be processed for design verification of the device under test. During operation 516, the hardware processor (e.g., implementing the passive verification device) causes any sequence number-based data packet in the wait queue that comprises a respective sequence number larger than or equal to a select sequence number of the negative-acknowledgment data packet to be skipped for design verification-related processing and to be removed from the wait queue.

According to some embodiments, performance of method 500 results in the hardware processor (e.g., implementing the passive verification device) iterating through and examining each sequence number-based data packet stored in the wait queue.

Figure 6:
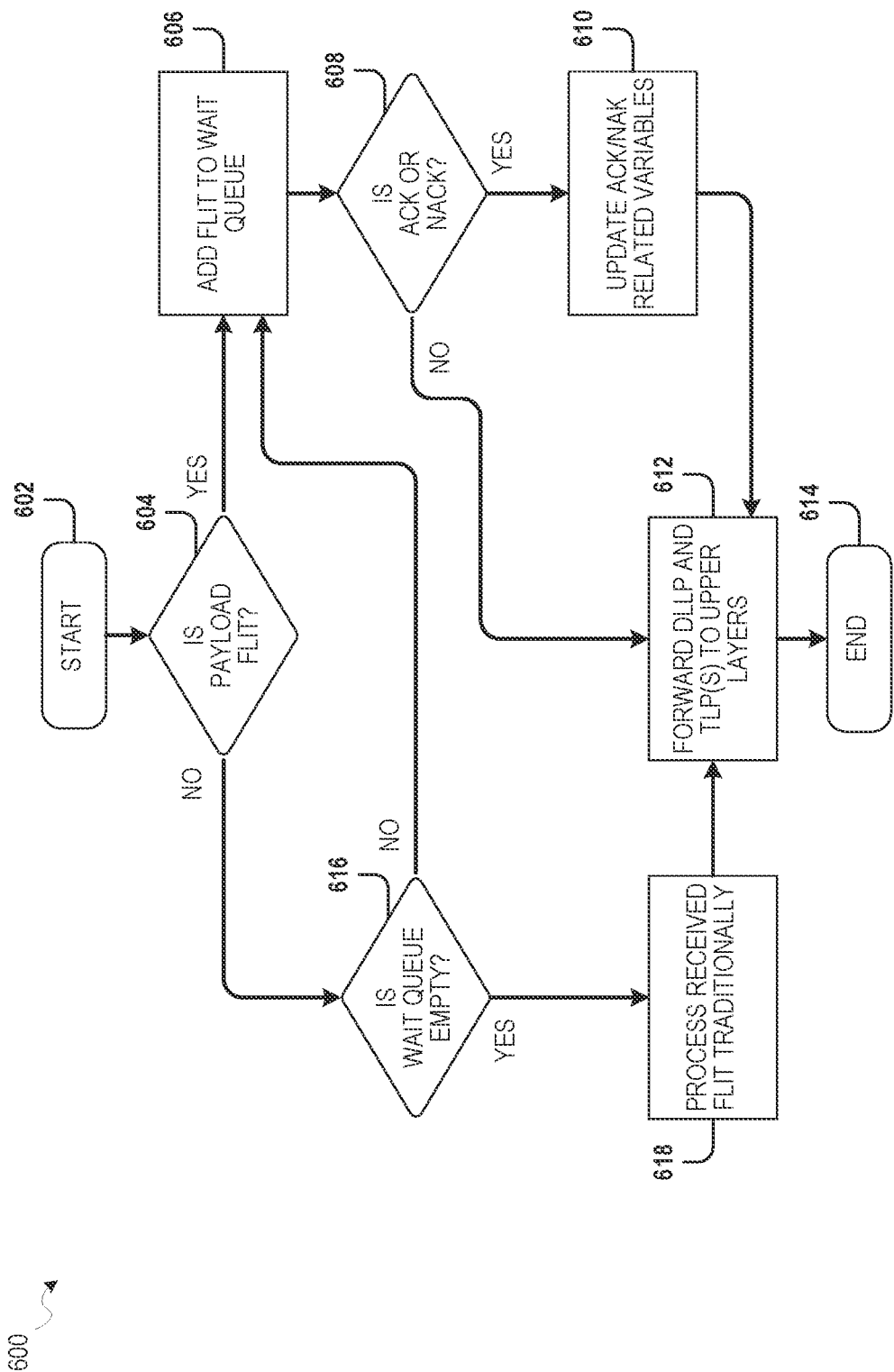

Referring now to FIG. 6, method 600 is an example method performed by a passive verification device (e.g., operating as a verification monitor) to process one or more data packets (e.g., FLITs) transmitted from an active verification device (e.g., 210) to a DUT (e.g., 202). From start 602, method 600 proceeds to operation 604, where a passive verification device (e.g., operating as a verification monitor) determines whether a FLIT (RX_FLIT to DUT), detected as being transmitted from an active verification device to a device under test (DUT), is a payload FLIT. If the passive verification device determines that the FLIT is a payload FLIT, method 600 proceeds to operation 606, otherwise method 600 proceeds to operation 616. At operation 606, the passive verification device adds the (payload) FLIT to a wait queue (e.g., receive (RX) wait queue) of the passive verification device and then, at operation 608, the passive verification device determines whether the FLIT is an acknowledgment (ACK) FLIT or a negative-acknowledgment (NAK) FLIT. If the passive verification device determines that the FLIT is an ACK FLIT or a NAK FLIT, method 600 proceeds to operation 610, and if the passive verification device determines that the FLIT is neither an ACK FLIT nor a NAK FLIT, method 600 proceeds to operation 612. During operation 610, the passive verification device updates one or more ACK-related variables on the passive verification device, one or more NAK-related variables on the passive verification device, or both. After operation 610, method 600 proceeds to operation 612.

For operation 616, the passive verification device determines whether the wait queue of the passive verification device is empty. If the passive verification device determines that the wait queue of the passive verification device is empty, method 600 proceeds to operation 618, where the passive verification device processes the FLIT traditionally, and method 600 then proceeds to operation 612. If the passive verification device determines that the wait queue of the passive verification device is not empty, method 600 proceeds to operation 606, where the passive verification device adds the FLIT queue to the wait queue.

At operation 612, the passive verification device forwards one or more DLLPs, one or more TLPs, or both from the FLIT to one or more upper layers of the passive verification device, where the upper layers can be defined by the data communication specification. After operation 612, method 600 ends at operation 614.

Figure 7:
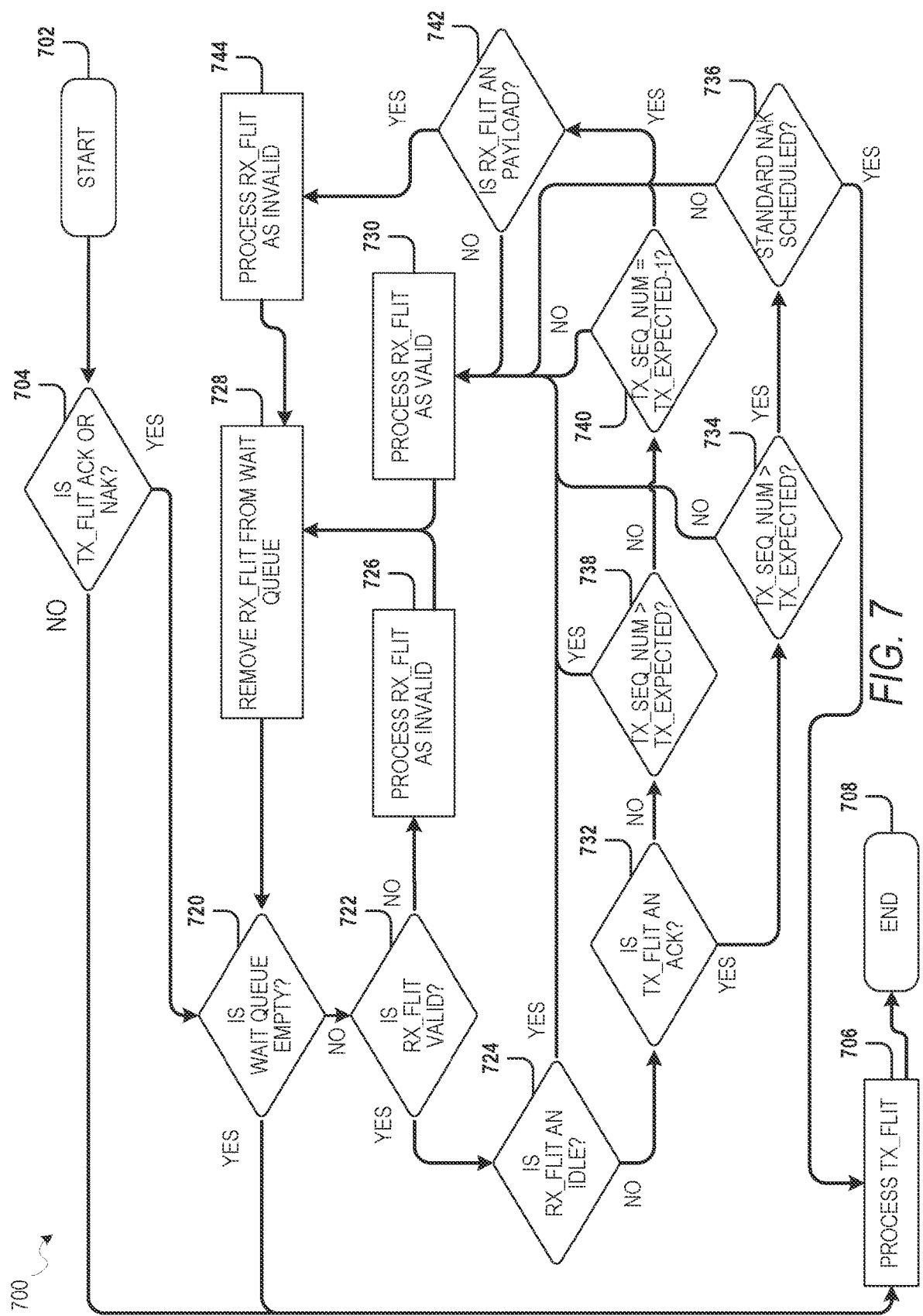

Referring now to FIG. 7, method 700 is an example method performed by a passive verification device (e.g., operating as a verification monitor) to process one or more data packets (e.g., FLITs) transmitted from a DUT (e.g., 202) to an active verification device (e.g., 210). From start 702, method 700 proceeds to operation 704, where a passive verification device (e.g., operating as a verification monitor) determines whether a FLIT (TX_FLIT from DUT), detected as being transmitted from a device under test (DUT) to an active verification device, is an acknowledgment (ACK) FLIT or a negative-acknowledgment (NAK) FLIT. If the passive verification device determines that the TX_FLIT is an ACK FLIT or a NAK FLIT, method 700 proceeds to operation 720. If the passive verification device determines that the TX_FLIT is neither an ACK FLIT nor a NAK FLIT, method 700 proceeds to operation 706.

At operation 720, the passive verification device determines whether a wait queue (of the passive verification device) is empty. If the passive verification device determines that the wait queue is empty, method 700 proceeds to operation 706, otherwise method 700 proceeds to operation 722.

During operation 722, the passive verification device determines whether a next FLIT (RX_FLIT) from the wait queue is valid. If the passive verification device determines that the RX_FLIT is valid, method 700 proceeds to operation 724, otherwise method 700 proceeds to operation 726.

The passive verification device determines, at operation 724, whether the RX_FLIT is an idle FLIT. If the passive verification device determines that the RX_FLIT is an idle FLIT, method 700 proceeds to operation 730, otherwise method 700 proceeds to operation 732.

At operation 732, the passive verification device determines whether the TX_FLIT (from the DUT) is an ACK FLIT. If the passive verification device determines that the TX_FLIT is an ACK FLIT, method 700 proceeds operation 734, otherwise method 700 proceeds to operation 738.

At operation 734, the passive verification device determines whether an actual sequence number (TX_SEQ_NUM) of the TX_FLIT (from the DUT) is greater than an expected sequence number (TX_EXPECTED) for TX_FLIT. If the passive verification device determines that the TX_SEQ_NUM is greater than the TX_EXPECTED, method 700 proceeds to operation 736, otherwise method 700 proceeds to operation 730. During operation 736, the passive verification device determines whether a standard NAK is scheduled. If the passive verification device determines that a standard NAK is scheduled, method 700 proceeds to operation 706, otherwise method 700 proceeds to operation 730.

For operation 738, the passive verification device determines whether the TX_SEQ_NUM is greater than the TX_EXPECTED, method 700 proceeds to operation 740, otherwise method 700 proceeds to operation 730. During operation 740, the passive verification device determines whether the TX_SEQ_NUM is equal to (TX_EXPECTED−1), method 700 proceeds to operation 742, otherwise method 700 proceeds to operation 730. At operation 742, the passive verification device determines whether RX_FLIT is a payload FLIT. If the passive verification device determines that RX_FLIT is a payload FLIT, method 700 proceeds to operation 744, otherwise method 700 proceeds to operation 730.

At each of operations 726 and operation 744, the passive verification device processes RX_FLIT as invalid and, thereafter, the passive verification device removes RX_FLIT from the wait queue at operation 728. For operation 730, the passive verification device processes RX_FLIT as valid and, thereafter, the passive verification device removes RX_FLIT from the wait queue at operation 728. After operation 728, method 700 returns to operation 720, where the passive verification device redetermines whether the wait queue is empty and, if not, method 700 proceeds to operation 722 to operate on the next FLIT (RX_FLIT) from the wait queue.

Eventually, at operation 706, the passive verification device processes the TX_FLIT, and then method 700 ends at operation 708.

FIGS. 8 through 11 are diagrams illustrating example scenarios 800, 900, 1000, 1100 where design verification is performed using sequence number-based monitor synchronization, according to some embodiments. In each of the scenarios 800, 900, 1000, 1100, VIP monitor 802 represents a passive verification device of a verification software system, device under test (DUT) 804 represents a circuit design to be verified (by the VIP monitor 802) and operating within a simulation, and VIP model 806 represents an active verification device of the verification system.

Figure 8:
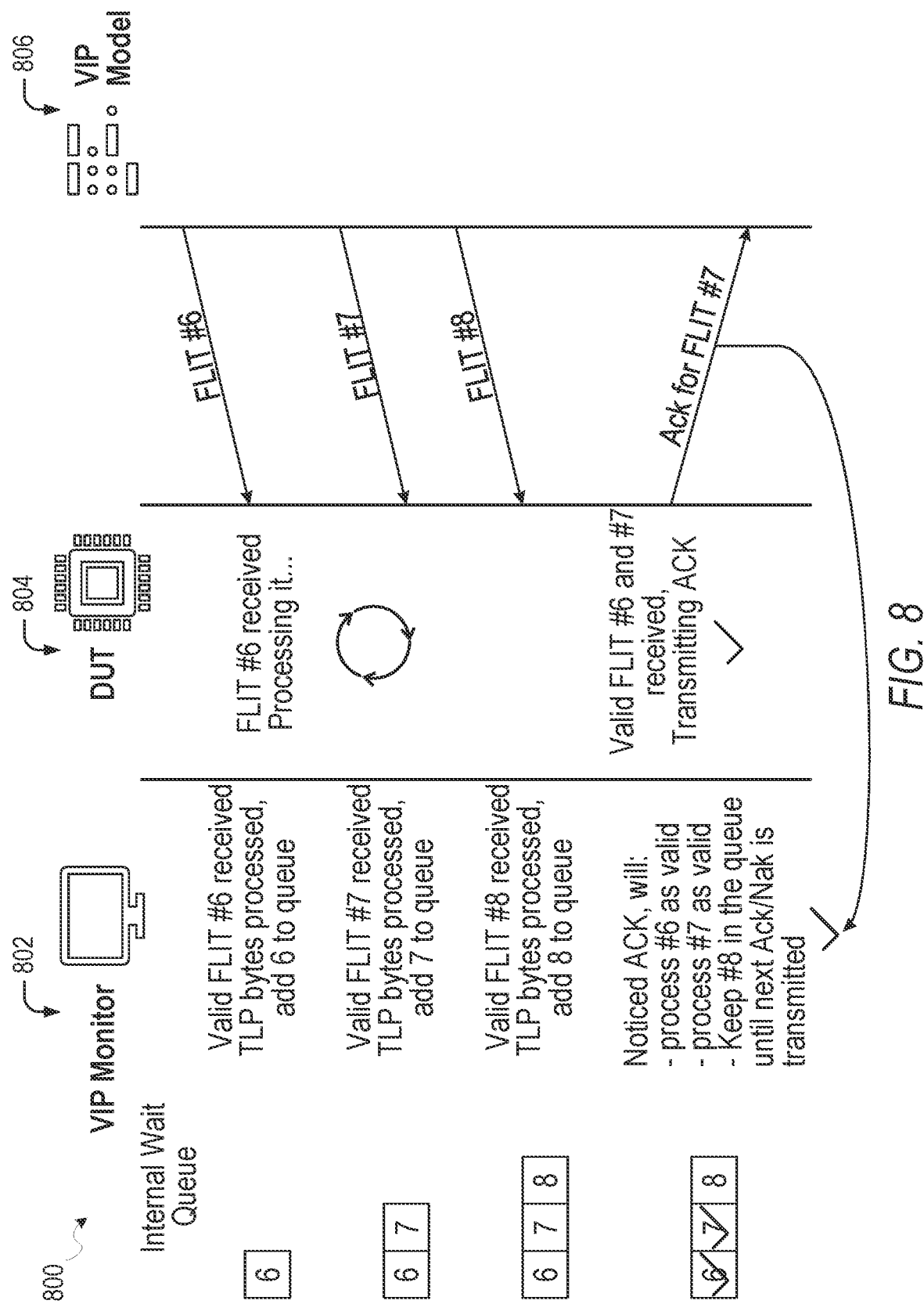
FIGS. 8 through 11 are diagrams illustrating example scenarios where design verification is performed using sequence number-based monitor synchronization, according to some embodiments.

In the example scenario 800 of FIG. 8, VIP model 806 transmits FLIT #6 to DUT 804 over a simulated data bus and, in response, VIP monitor 802 receives the valid FLIT #6, processes TLP bytes from FLIT #6, and adds FLIT #6 to a wait queue of the VIP monitor 802. VIP model 806 then transmits FLIT #7 to DUT 804 over the simulated data bus and, in response, VIP monitor 802 receives the valid FLIT #7, processes TLP bytes from FLIT #7 and adds FLIT #7 to the wait queue of the VIP monitor 802. VIP model 806 then transmits FLIT #8 to DUT 804 over the simulated data bus and, in response, VIP monitor 802 receives the valid FLIT #8, processes TLP bytes from FLIT #8 and adds FLIT #8 to the wait queue of the VIP monitor 802.

Sometime after DUT 804 receives FLIT #8, DUT 804 transmits an ACK FLIT for FLIT #7 to VIP model 806 over the simulated data bus (e.g., in response to DUT 804 determining that FLIT #6 and FLIT #7 are valid). In accordance with various embodiments, VIP monitor 802 detects the ACK FLIT for FLIT #7. In response, VIP monitor 802 processes FLIT #6 from the wait queue of VIP monitor 802 as a valid FLIT and removes FLIT #6 from the wait queue, VIP monitor 802 processes FLIT #7 from the wait queue of VIP monitor 802 as a valid FLIT and removes FLIT #7 from the wait queue, and VIP monitor 802 keeps (e.g., retains) FLIT #8 in the wait queue for a next ACK FLIT or a NAK FLIT transmitted from DUT 804 to VIP model 806.

Figure 9:
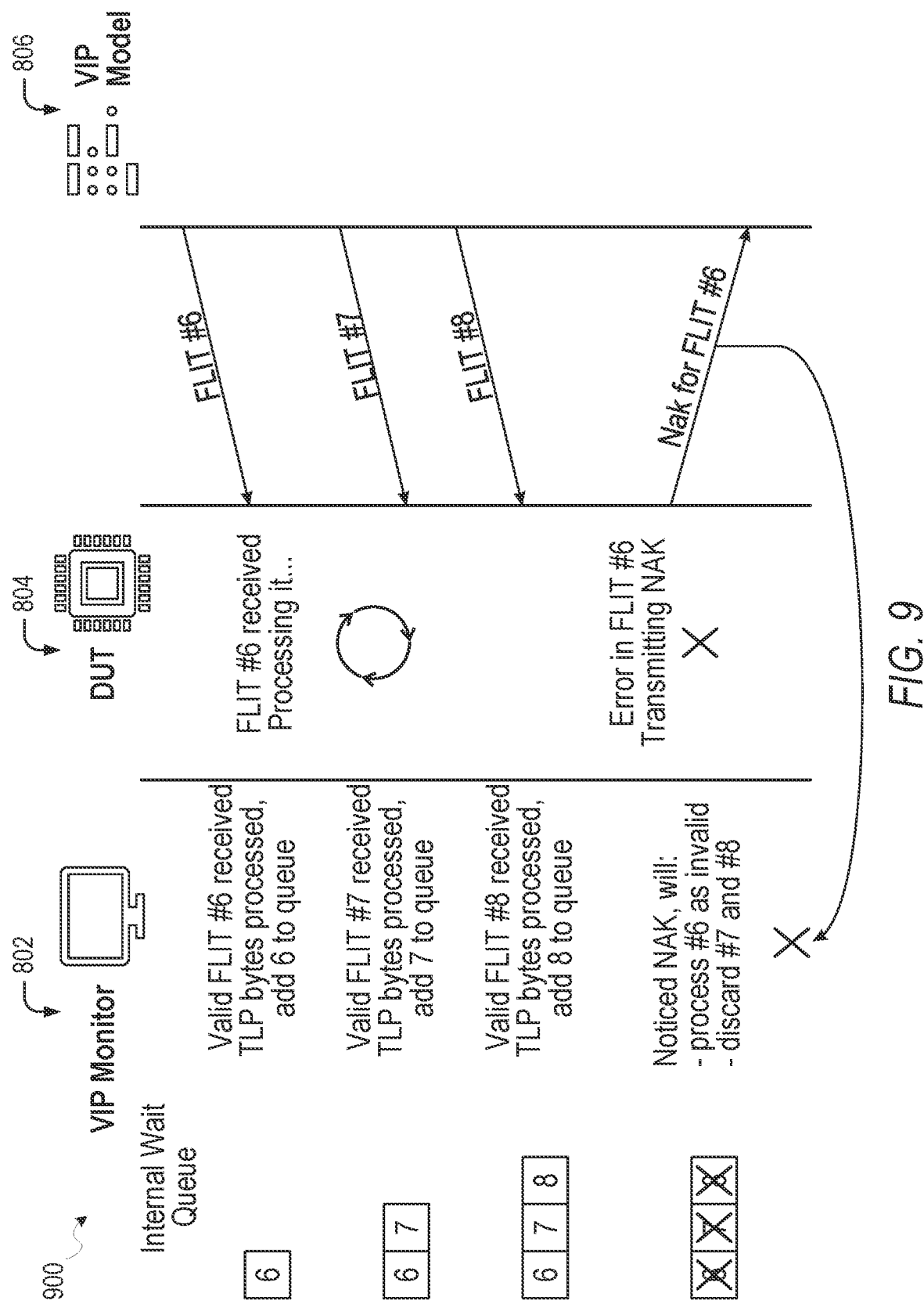

In the example scenario 900 of FIG. 9, VIP model 806 transmits FLIT #6 to DUT 804 over a simulated data bus and, in response, VIP monitor 802 receives the valid FLIT #6, processes TLP bytes from FLIT #6, and adds FLIT #6 to a wait queue of the VIP monitor 802. VIP model 806 then transmits FLIT #7 to DUT 804 over the simulated data bus and, in response, VIP monitor 802 receives the valid FLIT #7, processes TLP bytes from FLIT #7, and adds FLIT #7 to the wait queue of the VIP monitor 802. VIP model 806 then transmits FLIT #8 to DUT 804 over the simulated data bus and, in response, VIP monitor 802 receives the valid FLIT #8, processes TLP bytes from FLIT #8, and adds FLIT #8 to the wait queue of the VIP monitor 802.

Sometime after DUT 804 receives FLIT #8, DUT 804 transmits an NAK FLIT for FLIT #6 to VIP model 806 over the simulated data bus (e.g., in response to DUT 804 detecting an error in FLIT #6). In accordance with various embodiments, VIP monitor 802 detects the NAK FLIT for FLIT #6. In response, VIP monitor 802 processes FLIT #6 from the wait queue of VIP monitor 802 as an invalid FLIT and removes FLIT #6 from the wait queue, and VIP monitor 802 removes FLIT #7 and FLIT #8 from the wait queue without processing FLIT #7 and FLIT #8, thereby discarding FLIT #7 and FLIT #8.

Figure 10:
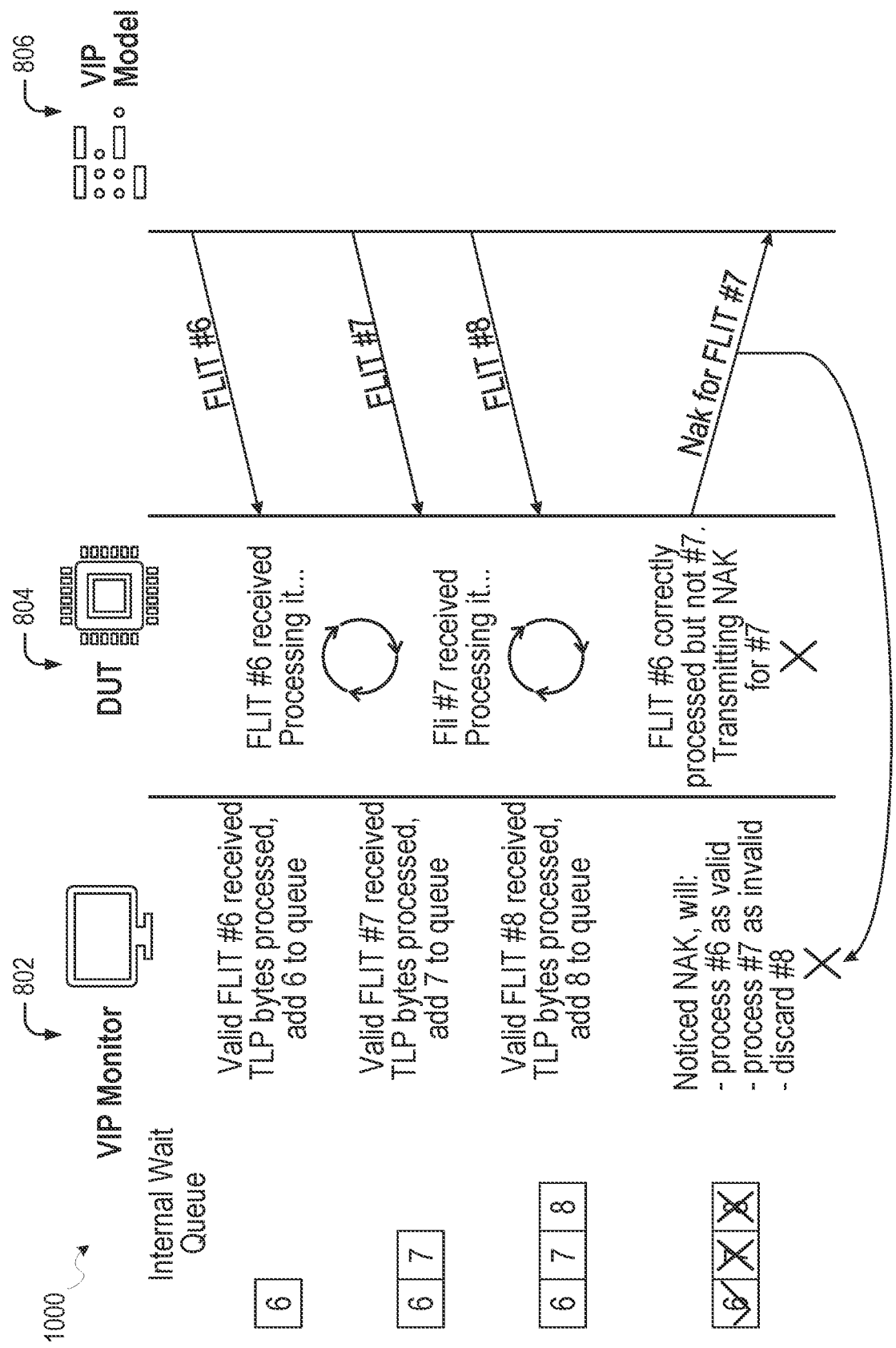

In the example scenario 1000 of FIG. 10, VIP model 806 transmits FLIT #6 to DUT 804 over a simulated data bus and, in response, VIP monitor 802 receives the valid FLIT #6, processes TLP bytes from FLIT #6, and adds FLIT #6 to a wait queue of the VIP monitor 802. VIP model 806 then transmits FLIT #7 to DUT 804 over the simulated data bus and, in response, VIP monitor 802 receives the valid FLIT #7, processes TLP bytes from FLIT #7, and adds FLIT #7 to the wait queue of the VIP monitor 802. VIP model 806 then transmits FLIT #8 to DUT 804 over the simulated data bus and, in response, VIP monitor 802 receives the valid FLIT #8, processes TLP bytes from FLIT #8, and adds FLIT #8 to the wait queue of the VIP monitor 802.

Sometime after DUT 804 receives FLIT #8, DUT 804 transmits an NAK FLIT for FLIT #7 to VIP model 806 over the simulated data bus (e.g., in response to DUT 804 determining that FLIT #6 is valid but FLIT #7 is invalid). In accordance with various embodiments, VIP monitor 802 detects the NAK FLIT for FLIT #7. In response, VIP monitor 802 processes FLIT #6 from the wait queue of VIP monitor 802 as valid and removes FLIT #6 from the wait queue, VIP monitor 802 processes FLIT #7 from the wait queue of VIP monitor 802 as invalid and removes FLIT #7 from the wait queue, and VIP monitor 802 removes FLIT #8 from the wait queue for with processing, thereby discarding FLIT #8.

Figure 11:
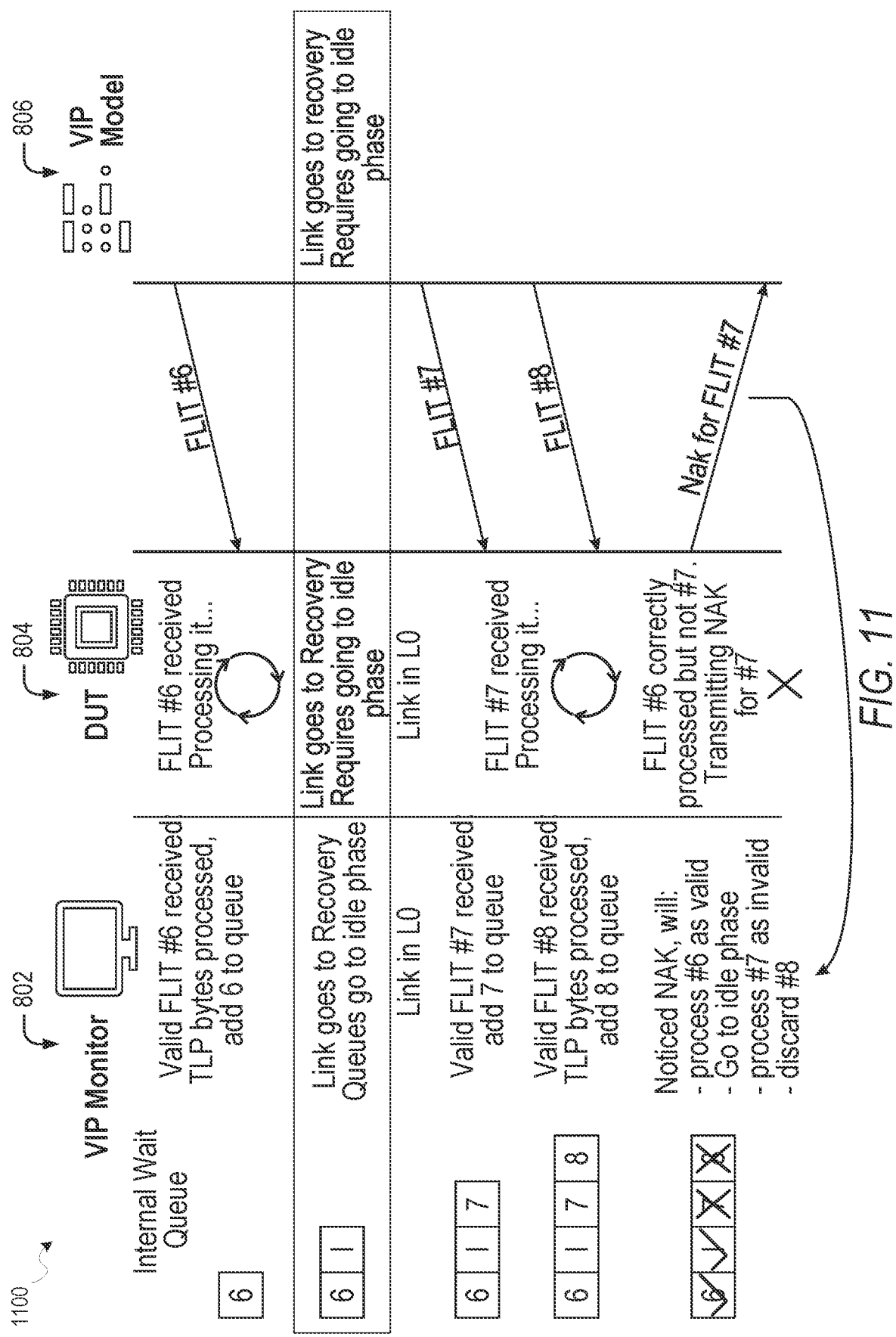

In the example scenario 1100 of FIG. 11, VIP model 806 transmits FLIT #6 to DUT 804 over a simulated data bus and, in response, VIP monitor 802 receives the valid FLIT #6, processes TLP bytes from FLIT #6, and adds FLIT #6 to a wait queue of the VIP monitor 802. The link between DUT 804 and VIP model 806 goes to recovery, and both DUT 804 and VIP model 806 go to idle phase. Then, the link between DUT 804 and VIP model 806 goes back to L0, and both DUT 804 and VIP model 806 can resume the exchange of FLITs. VIP model 806 then transmits FLIT #7 to DUT 804 over the simulated data bus and, in response, VIP monitor 802 receives the valid FLIT #7, processes TLP bytes from FLIT #7, and adds FLIT #7 to the wait queue of the VIP monitor 802. VIP model 806 then transmits FLIT #8 to DUT 804 over the simulated data bus and, in response, VIP monitor 802 receives the valid FLIT #8, processes TLP bytes from FLIT #8, and adds FLIT #8 to the wait queue of the VIP monitor 802.

Sometime after DUT 804 receives FLIT #8, DUT 804 transmits a NAK FLIT for FLIT #7 to VIP model 806 over the simulated data bus. In accordance with various embodiments, VIP monitor 802 detects the NAK FLIT for FLIT #7. In accordance with various embodiments, VIP monitor 802 detects the NAK FLIT for FLIT #7. In response, VIP monitor 802 processes FLIT #6 from the wait queue of VIP monitor 802 as valid and removes FLIT #6 from the wait queue, VIP monitor 802 processes the idle phase (based on the link going to recovery and the wait queue going to idle phase), VIP monitor 802 processes FLIT #7 from the wait queue of VIP monitor 802 as invalid and removes FLIT #7 from the wait queue, and VIP monitor 802 removes FLIT #8 from the wait queue for with processing, thereby discarding FLIT #8.

Figure 12:
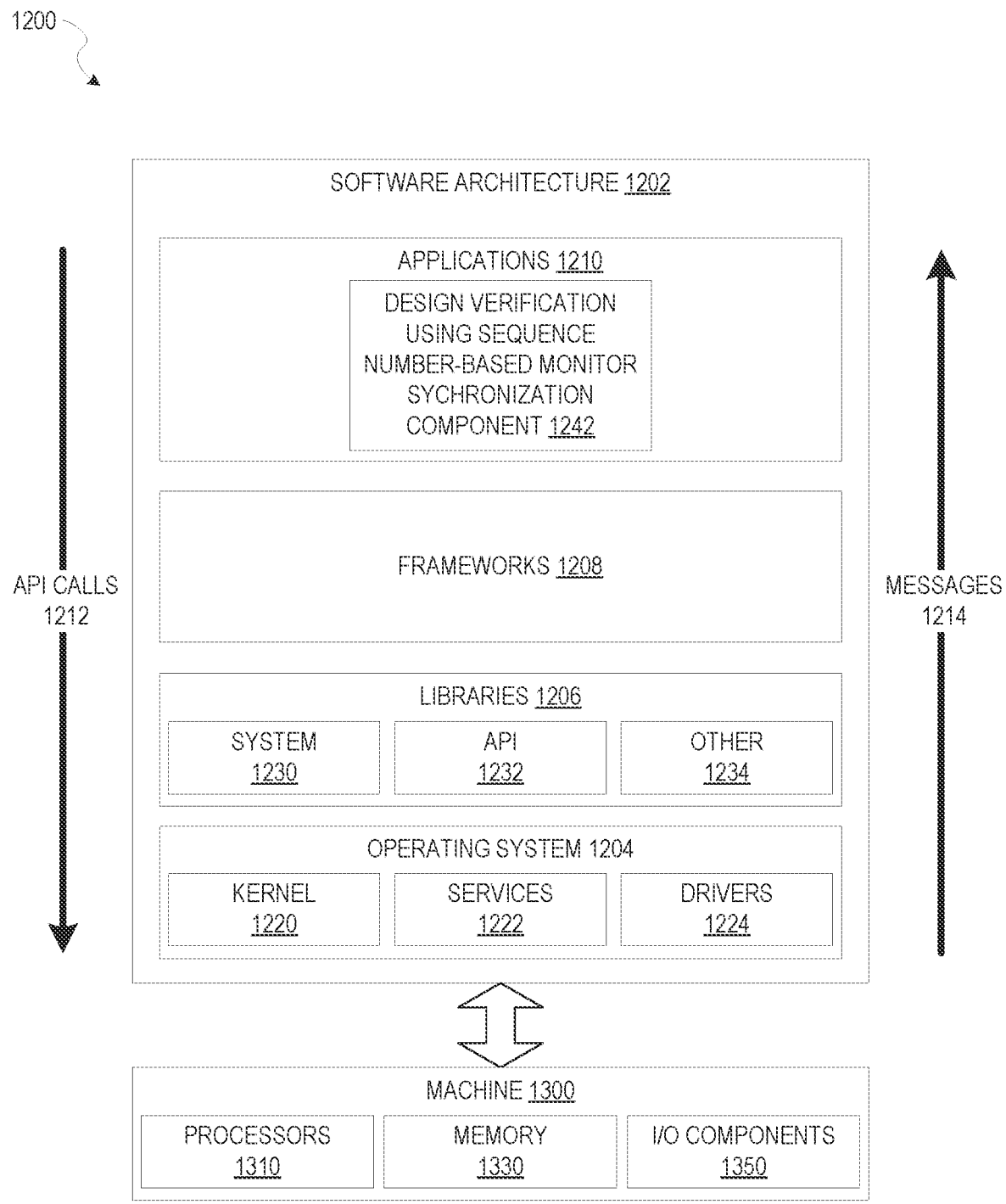
FIG. 12 is a block diagram illustrating an example of a software architecture that may be operating on a design verification computer and may be used with methods for design verification using a sequence number-based monitor synchronization, according to some embodiments.

FIG. 12 is a block diagram 1200 illustrating an example of a software architecture 1202 that may be operating on a design verification computer and may be used with methods for design verification using a sequence number-based monitor synchronization, according to some embodiments. The software architecture 1202 can be used as a design verification computing device to implement any of the methods described above. Aspects of the software architecture 1202 may, in various embodiments, be used to store circuit designs, and to facilitate generation of a circuit design in a design verification environment by verifying a circuit design using a sequence number-based monitor synchronization.

FIG. 12 is merely a non-limiting example of a software architecture 1202, and it will be appreciated that many other architectures can be implemented to facilitate the functionality described herein. In various embodiments, the software architecture 1202 is implemented by hardware such as a machine 1300 of FIG. 13 that includes processors 1310 (e.g., hardware processors), memory 1330, and input/output (I/O) components 1350. In this example, the software architecture 1202 can be conceptualized as a stack of layers where each layer may provide a particular functionality. For example, the software architecture 1202 includes layers such as an operating system 1204, libraries 1206, software frameworks 1208, and applications 1210. Operationally, the applications 1210 invoke application programming interface (API) calls 1212 through the software stack and receive messages 1214 in response to the API calls 1212, consistent with some embodiments. In various embodiments, any client device, any server computer of a server system, or any other device described herein may operate using elements of the software architecture 1202. A design verification computing device described herein may additionally be implemented using aspects of the software architecture 1202, with the software architecture 1202 adapted for design verification using a sequence number-based monitor synchronization in any manner described herein.

In some embodiments, a design verification application of the applications 1210 verifies a circuit design using a sequence number-based monitor synchronization according to embodiments described herein using various components within the software architecture 1202. For example, in some embodiments, a design verification computing device similar to the machine 1300 includes the memory 1330 and the one or more processors 1310. The processors 1310 also implement design verification using sequence number-based monitor synchronization component 1242 for design verification using a sequence number-based monitor synchronization, in accordance with various embodiments described herein.

In various other embodiments, rather than being implemented as components of the one or more applications 1210, the design verification using sequence number-based monitor synchronization component 1242 may be implemented using elements of the libraries 1206, the operating system 1204, or the software frameworks 1208.

In various implementations, the operating system 1204 manages hardware resources and provides common services. The operating system 1204 includes, for example, a kernel 1220, services 1222, and drivers 1224. The kernel 1220 acts as an abstraction layer between the hardware and the other software layers, consistent with some embodiments. For example, the kernel 1220 provides memory management, processor management (e.g., scheduling), component management, networking, and security settings, among other functionalities. The services 1222 can provide other common services for the other software layers. The drivers 1224 are responsible for controlling or interfacing with the underlying hardware, according to some embodiments. For instance, the drivers 1224 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 1206 provide a low-level common infrastructure utilized by the applications 1210. The libraries 1206 can include system libraries 1230 such as libraries of blocks for use in a design verification environment or other libraries that can provide functions such as memory allocation functions, string manipulation functions, mathematic functions, and the like. In addition, the libraries 1206 can include API libraries 1232 such as media libraries (e.g., libraries to support presentation and manipulation of various media formats such as Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 1206 may also include other libraries 1234.

The software frameworks 1208 provide a high-level common infrastructure that can be utilized by the applications 1210, according to some embodiments. For example, the software frameworks 1208 provide various graphic user interface (GUI) functions, high-level resource management, high-level location services, and so forth. The software frameworks 1208 can provide a broad spectrum of other APIs that can be utilized by the applications 1210, some of which may be specific to a particular operating system 1204 or platform. In various embodiments, the systems, methods, devices, and instructions described herein may use various files, macros, libraries, and other elements of a design verification environment to implement design verification using sequence number-based monitor synchronization as described herein. This includes analysis of input design files for an integrated circuit design, along with any element of hierarchical analysis that may be used as part of or along with the embodiments described herein. While netlist files, library files, SDC files, and view definition files are examples that may operate within the software architecture 1202, it will be apparent that other files and structures may provide a similar function, in various embodiments.

Certain embodiments are described herein as including logic or a number of components, modules, elements, or mechanisms. Such components can constitute either software components (e.g., code embodied on a machine-readable medium or in a transmission signal) or hardware components. A "hardware component" is a tangible unit capable of performing certain operations and can be configured or arranged in a certain physical manner. In various embodiments, one or more computer systems (e.g., a standalone computer system, a client computer system, or a server computer system) or one or more hardware components of a computer system (e.g., a processor or a group of processors) are configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a field-programmable gate array (FPGA) or an application-specific integrated circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "component" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose hardware processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented components that operate to perform one or more operations or functions described herein. As used herein, "processor-implemented component" refers to a hardware component implemented using one or more processors.

Similarly, the methods described herein can be at least partially processor-implemented, with a particular processor or processors being an example of hardware. For example, at least some of the operations of a method can be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines 1300 including processors 1310), with these operations being accessible via a network (e.g., the Internet) and via one or more appropriate interfaces (e.g., an API). In certain embodiments, for example, a client device may relay or operate in communication with cloud computing systems and may access circuit design information in a cloud environment.

The performance of certain of the operations may be distributed among the processors, not only residing within a single machine 1300, but deployed across a number of machines 1300. In some embodiments, the processors 1310 or processor-implemented components are located in a single geographic location (e.g., within a home environment, an office environment, or a server farm). In some other embodiments, the processors or processor-implemented components are distributed across a number of geographic locations.

Figure 13:
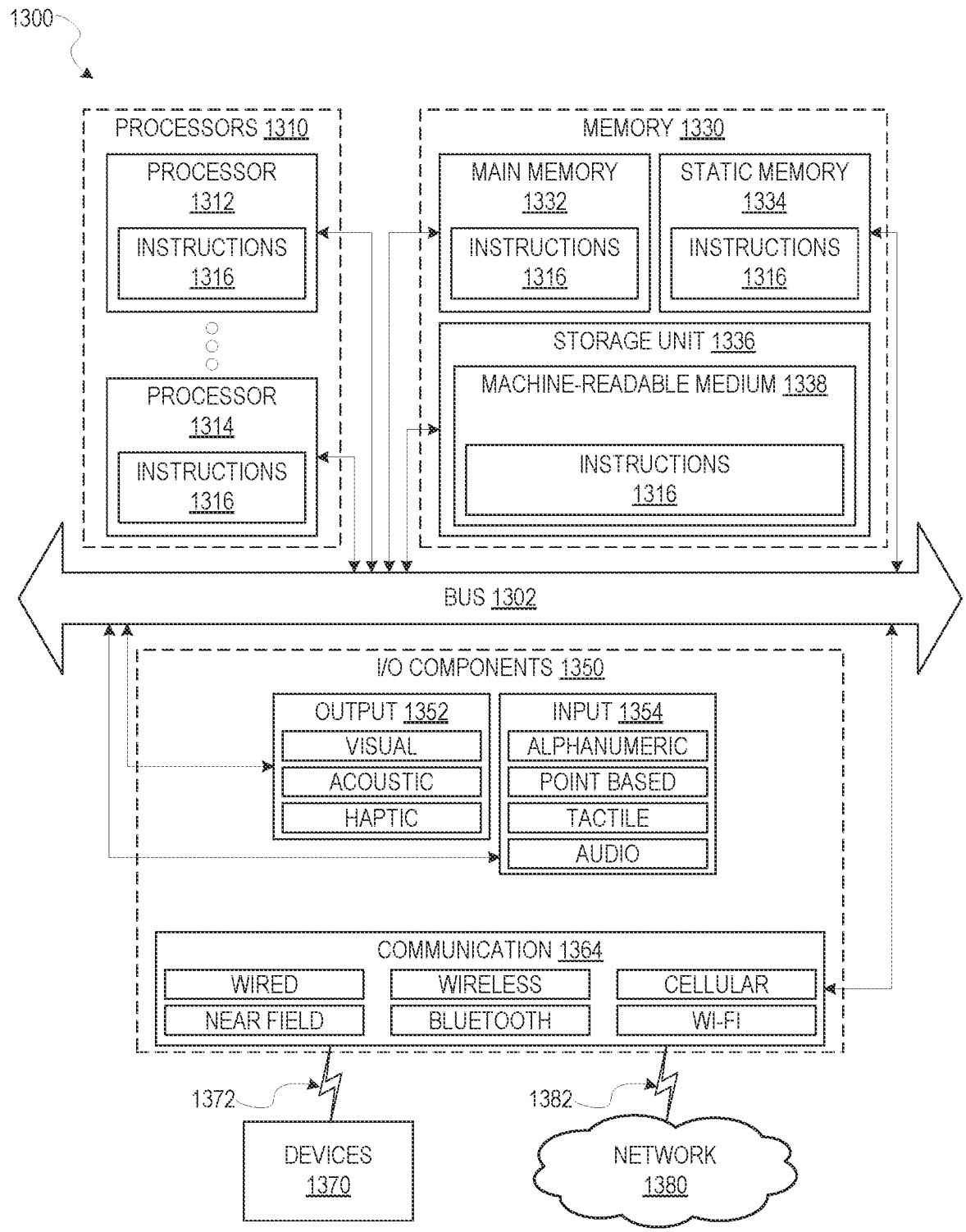
FIG. 13 is a diagrammatic representation of the machine in the form of a computer system within which a set of instructions may be executed for causing the machine to perform any one or more of the methodologies discussed herein, according to some embodiments.

FIG. 13 is a diagrammatic representation of the machine 1300 in the form of a computer system within which a set of instructions may be executed for causing the machine 1300 to perform any one or more of the methodologies discussed herein, according to some embodiments. FIG. 13 shows components of the machine 1300, which is, according to some embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein can be executed. In alternative embodiments, the machine 1300 operates as a standalone device or can be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 can comprise, but not be limited to, a server computer, a client computer, a personal computer (PC), a tablet computer, a laptop computer, a netbook, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

In various embodiments, the machine 1300 comprises processors 1310, memory 1330, and I/O components 1350, which can be configured to communicate with each other via a bus 1302. In some embodiments, the processors 1310 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another, or any suitable combination thereof) include, for example, a processor 1312 and a processor 1314 that may execute the instructions 1316. The term "processor" is intended to include multi-core processors 1310 that may comprise two or more independent processors 1312, 1314 (also referred to as "cores") that can execute the instructions 1316 contemporaneously. Although FIG. 13 shows multiple processors 1310, the machine 1300 may include a single processor 1312 with a single core, a single processor 1312 with multiple cores (e.g., a multi-core processor 1312), multiple processors 1310 with a single core, multiple processors 1310 with multiple cores, or any combination thereof.

The memory 1330 comprises a main memory 1332, a static memory 1334, and a storage unit 1336 accessible to the processors 1310 via the bus 1302, according to some embodiments. The storage unit 1336 can include a machine-readable medium 1338 on which are stored the instructions 1316 embodying any one or more of the methodologies or functions described herein. The instructions 1316 can also reside, completely or at least partially, within the main memory 1332, within the static memory 1334, within at least one of the processors 1310 (e.g., within the processor's cache memory), or any suitable combination thereof, during execution thereof by the machine 1300. Accordingly, in various embodiments, the main memory 1332, the static memory 1334, and the processors 1310 are considered machine-readable media 1338.

As used herein, the term "memory" refers to a machine-readable medium 1338 able to store data temporarily or permanently and may be taken to include, but not be limited to, random-access memory (RAM), read-only memory (ROM), buffer memory, flash memory, and cache memory. While the machine-readable medium 1338 is shown, in some embodiments, to be a single medium, the term "machine-readable medium" should be taken to include a single medium or multiple media (e.g., a centralized or distributed database, or associated caches and servers) able to store the instructions 1316. The term "machine-readable medium" shall also be taken to include any medium, or combination of multiple media, that is capable of storing instructions (e.g., the instructions 1316) for execution by a machine (e.g., the machine 1300), such that the instructions, when executed by one or more processors of the machine (e.g., the processors 1310), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1350 include a wide variety of components to receive input, provide output, produce output, transmit information, exchange information, capture measurements, and so on. In general, it will be appreciated that the I/O components 1350 can include many other components that are not shown in FIG. 13. The I/O components 1350 are grouped according to functionality merely for simplifying the following discussion, and the grouping is in no way limiting. In various embodiments, the I/O components 1350 include output components 1352 and input components 1354. The output components 1352 include visual components (e.g., a display (or hardware display) such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1354 include alphanumeric input components (e.g., a keyboard, a touch screen configured to receive alphanumeric input, a photo-optical keyboard, or other alphanumeric input components), point-based input components (e.g., a mouse, a touchpad, a trackball, or other pointing instruments), tactile input components (e.g., a physical button, a touch screen that provides location and force of touches or touch gestures, or other tactile input components), audio input components (e.g., a microphone), and the like.

Communication can be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 include a network interface component or another suitable device to interface with the network 1380. In further examples, the communication components 1364 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1370 may be another machine or any of a wide variety of peripheral devices (e.g., a peripheral device coupled via a USB).

In various embodiments, one or more portions of the network 1380 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling.

Furthermore, the machine-readable medium 1338 is non-transitory (in other words, not having any transitory signals) in that it does not embody a propagating signal. However, labeling the machine-readable medium 1338 "non-transitory" should not be construed to mean that the machine-readable medium 1338 is incapable of movement; the machine-readable medium 1338 should be considered as being transportable from one physical location to another. Additionally, since the machine-readable medium 1338 is tangible, the machine-readable medium 1338 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to some embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A system comprising:
 a memory storing instructions; and
 a hardware processor communicatively coupled to the memory and configured by the instructions to perform operations comprising, while operation of a circuit design is simulated as a device under test for design verification:
 monitoring for sequence number-based data packets transmitted from an active verification device to the device under test over a simulated data bus in accordance with a data communication specification, each sequence number-based data packet comprising a sequence number;
 monitoring for acknowledgment-related data packets, transmitted from the device under test to the active verification device, over the simulated data bus in accordance with the data communication specification;
 in response to detecting a new sequence number-based data packet being transmitted from the active verification device to the device under test over the simulated data bus, deferring design verification-related processing of the new sequence number-based data packet by adding the new sequence number-based data packet to a wait queue; and
 in response to detecting a new acknowledgment-related data packet being transmitted from the device under test to the active verification device over the simulated data bus:
  examining the new acknowledgment-related data packet; and
  performing design verification-related processing of one or more sequence number-based data packets in the wait queue based on the examining of the new acknowledgment-related data packet.

2. The system of claim 1, wherein the examining of the new acknowledgment-related data packet comprises:
 determining whether the new acknowledgment-related data packet is an acknowledgment data packet; and
 wherein the performing of the design verification-related processing of the one or more sequence number-based data packets in the wait queue based on the examining of the new acknowledgment-related data packet comprises:
 in response to determining that the new acknowledgment-related data packet is the acknowledgment data packet:
  while skipping design verification-related processing of any sequence number-based data packet in the wait queue that comprises a respective sequence number larger than a select sequence number of the acknowledgment data packet, causing any next sequence number-based data packets in the wait queue that comprises a sequence number less than or equal to the select sequence number of the acknowledgment data packet to be processed for design verification of the device under test and to be removed from the wait queue.

3. The system of claim 2, wherein in response to determining that the new acknowledgment-related data packet is the acknowledgment data packet:
 causing any sequence number-based data packet in the wait queue that comprises a respective sequence number larger than the select sequence number of the acknowledgment data packet to be skipped for design verification-related processing and to be retained in the wait queue.

4. The system of claim 1, wherein the examining of the new acknowledgment-related data packet comprises:
 determining whether the new acknowledgment-related data packet is a negative-acknowledgment data packet; and
 wherein the performing of the design verification-related processing of the one or more sequence number-based data packets in the wait queue based on the examining of the new acknowledgment-related data packet comprises:
  in response to determining that the new acknowledgment-related data packet is the negative-acknowledgment data packet:
    causing any next sequence number-based data packets in the wait queue that comprises a sequence number less than a select sequence number of the negative-acknowledgment data packet to be processed for design verification of the device under test and to be removed from the wait queue.

5. The system of claim 1, wherein the examining of the new acknowledgment-related data packet comprises:
  determining whether the new acknowledgment-related data packet is a negative-acknowledgment data packet; and
  wherein the performing of the design verification-related processing of the one or more sequence number-based data packets in the wait queue based on the examining of the new acknowledgment-related data packet comprises:
    in response to determining that the new acknowledgment-related data packet is the negative-acknowledgment data packet:
      causing any sequence number-based data packet in the wait queue that comprises a respective sequence number larger than or equal to a select sequence number of the negative-acknowledgment data packet to be skipped for design verification-related processing and to be removed from the wait queue.

6. The system of claim 1, wherein each data packet is a fixed byte-size unit (FLIT), and wherein each sequence number-based data packet is a payload FLIT.

7. The system of claim 1, wherein each data packet is a fixed byte-size unit (FLIT), and wherein each acknowledgment-related sequence number-based data packet is either an acknowledgment (ACK) FLIT or a negative-acknowledgment (NAK) FLIT.

8. The system of claim 1, wherein the data communication specification is a version of a Peripheral Component Interconnect Express (PCIe) specification.

9. The system of claim 1, wherein the examining of the new acknowledgment-related data packet comprises:
  determining a select sequence number of the new acknowledgment-related data packet; and
  determining an acknowledgment type of the new acknowledgment-related data packet;
  wherein the performing of the design verification-related processing of the one or more sequence number-based data packets in the wait queue based on the examining of the new acknowledgment-related data packet comprises:
  for each single sequence number-based data packet in the wait queue:
    determining whether to process the single sequence number-based data packet for design verification of the device under test based on the select sequence number of the new acknowledgment-related data packet and the acknowledgment type of the new acknowledgment-related data packet; and
    performing design verification-related processing of the single sequence number-based data packet in response to determining that the single sequence number-based data packet is to be performed.

10. A non-transitory computer-readable medium comprising instructions that, when executed by a hardware processor of a device, cause the device to perform operations comprising, while operation of a circuit design is simulated as a device under test for design verification:
  monitoring for sequence number-based data packets transmitted from an active verification device to the device under test over a simulated data bus in accordance with a data communication specification, each sequence number-based data packet comprising a sequence number;
  monitoring for acknowledgment-related data packets, transmitted from the device under test to the active verification device, over the simulated data bus in accordance with the data communication specification;
  in response to detecting a new sequence number-based data packet being transmitted from the active verification device to the device under test over the simulated data bus, deferring design verification-related processing of the new sequence number-based data packet by adding the new sequence number-based data packet to a wait queue; and
  in response to detecting a new acknowledgment-related data packet being transmitted from the device under test to the active verification device over the simulated data bus:
    examining the new acknowledgment-related data packet; and
    performing design verification-related processing of one or more sequence number-based data packets in the wait queue based on the examining of the new acknowledgment-related data packet.

11. The non-transitory computer-readable medium of claim 10, wherein the examining of the new acknowledgment-related data packet comprises:
  determining whether the new acknowledgment-related data packet is an acknowledgment data packet; and
  wherein the performing of the design verification-related processing of the one or more sequence number-based data packets in the wait queue based on the examining of the new acknowledgment-related data packet comprises:
    in response to determining that the new acknowledgment-related data packet is the acknowledgment data packet:
      while skipping design verification-related processing of any sequence number-based data packet in the wait queue that comprises a respective sequence number larger than a select sequence number of the acknowledgment data packet, causing any next sequence number-based data packets in the wait queue that comprises a sequence number less than or equal to the select sequence number of the acknowledgment data packet to be processed for design verification of the device under test and to be removed from the wait queue.

12. The non-transitory computer-readable medium of claim 11, wherein in response to determining that the new acknowledgment-related data packet is the acknowledgment data packet:
  causing any sequence number-based data packet in the wait queue that comprises a respective sequence number larger than the select sequence number of the acknowledgment data packet to be skipped for design verification-related processing and to be retained in the wait queue.

13. The non-transitory computer-readable medium of claim 10, wherein the examining of the new acknowledgment-related data packet comprises:

determining whether the new acknowledgment-related data packet is a negative-acknowledgment data packet; and wherein the performing of the design verification-related processing of the one or more sequence number-based data packets in the wait queue based on the examining of the new acknowledgment-related data packet comprises:

in response to determining that the new acknowledgment-related data packet is the negative-acknowledgment data packet:

causing any next sequence number-based data packets in the wait queue that comprises a sequence number less than a select sequence number of the negative-acknowledgment data packet to be processed for design verification of the device under test and to be removed from the wait queue.

14. The non-transitory computer-readable medium of claim 10, wherein the examining of the new acknowledgment-related data packet comprises:

determining whether the new acknowledgment-related data packet is a negative-acknowledgment data packet; and wherein the performing of the design verification-related processing of the one or more sequence number-based data packets in the wait queue based on the examining of the new acknowledgment-related data packet comprises:

in response to determining that the new acknowledgment-related data packet is the negative-acknowledgment data packet:

causing any sequence number-based data packet in the wait queue that comprises a respective sequence number larger than or equal to a select sequence number of the negative-acknowledgment data packet to be skipped for design verification-related processing and to be removed from the wait queue.

15. The non-transitory computer-readable medium of claim 10, wherein each data packet is a fixed byte-size unit (FLIT), and wherein each sequence number-based data packet is a payload FLIT.

16. The non-transitory computer-readable medium of claim 10, wherein each data packet is a fixed byte-size unit (FLIT), and wherein each acknowledgment-related sequence number-based data packet is either an acknowledgment (ACK) FLIT or a negative-acknowledgment (NAK) FLIT.

17. The non-transitory computer-readable medium of claim 10, wherein the data communication specification is a version of a Peripheral Component Interconnect Express (PCIe) specification.

18. The non-transitory computer-readable medium of claim 10, wherein the examining of the new acknowledgment-related data packet comprises:

determining a select sequence number of the new acknowledgment-related data packet; and determining an acknowledgment type of the new acknowledgment-related data packet;

wherein the performing of the design verification-related processing of the one or more sequence number-based data packets in the wait queue based on the examining of the new acknowledgment-related data packet comprises:

for each single sequence number-based data packet in the wait queue:

determining whether to process the single sequence number-based data packet for design verification of the device under test based on the select sequence number of the new acknowledgment-related data packet and the acknowledgment type of the new acknowledgment-related data packet; and performing design verification-related processing of the single sequence number-based data packet in response to determining that the single sequence number-based data packet is to be performed.

19. A method comprising:

causing, by a hardware processor, operation of a circuit design to be simulated as a device under test for design verification;

causing, by the hardware processor, an active verification device to interact with the device under test over a simulated data bus in accordance with a data communication specification;

causing, by the hardware processor, a passive verification device to monitor interactions between the device under test and the active verification device over the simulated data bus, the passive verification device being configured to:

monitor for sequence number-based data packets transmitted from an active verification device to the device under test over a simulated data bus in accordance with the data communication specification, each sequence number-based data packet comprising a sequence number;

monitor for acknowledgment-related data packets, transmitted from the device under test to the active verification device in accordance with the data communication specification, over the simulated data bus;

in response to detecting a new sequence number-based data packet being transmitted from the active verification device to the device under test over the simulated data bus, defer design verification-related processing of the new sequence number-based data packet by adding the new sequence number-based data packet to a wait queue of the passive verification device; and in response to detecting a new acknowledgment-related data packet being transmitted from the device under test to the active verification device over the simulated data bus:

examine the new acknowledgment-related data packet; and perform design verification-related processing of one or more sequence number-based data packets in the wait queue based on the examining of the new acknowledgment-related data packet.

20. The method of claim 19, wherein the passive verification device is configured to examine the new acknowledgment-related data packet by:

determining a select sequence number of the new acknowledgment-related data packet; and determining an acknowledgment type of the new acknowledgment-related data packet;

wherein the performing of the design verification-related processing of the one or more sequence number-based data packets in the wait queue based on the examining of the new acknowledgment-related data packet comprises:

for each single sequence number-based data packet in the wait queue:

determining whether to process the single sequence number-based data packet for design verification of the device under test based on the select sequence number of the new acknowledgment-related data packet and the acknowledgment type of the new acknowledgment-related data packet; and performing design verification-related processing of the single sequence number-based data packet in response to determining that the single sequence number-based data packet is to be performed.

* * * * *